United States Patent Office 3,497,958
Patented Mar. 3, 1970

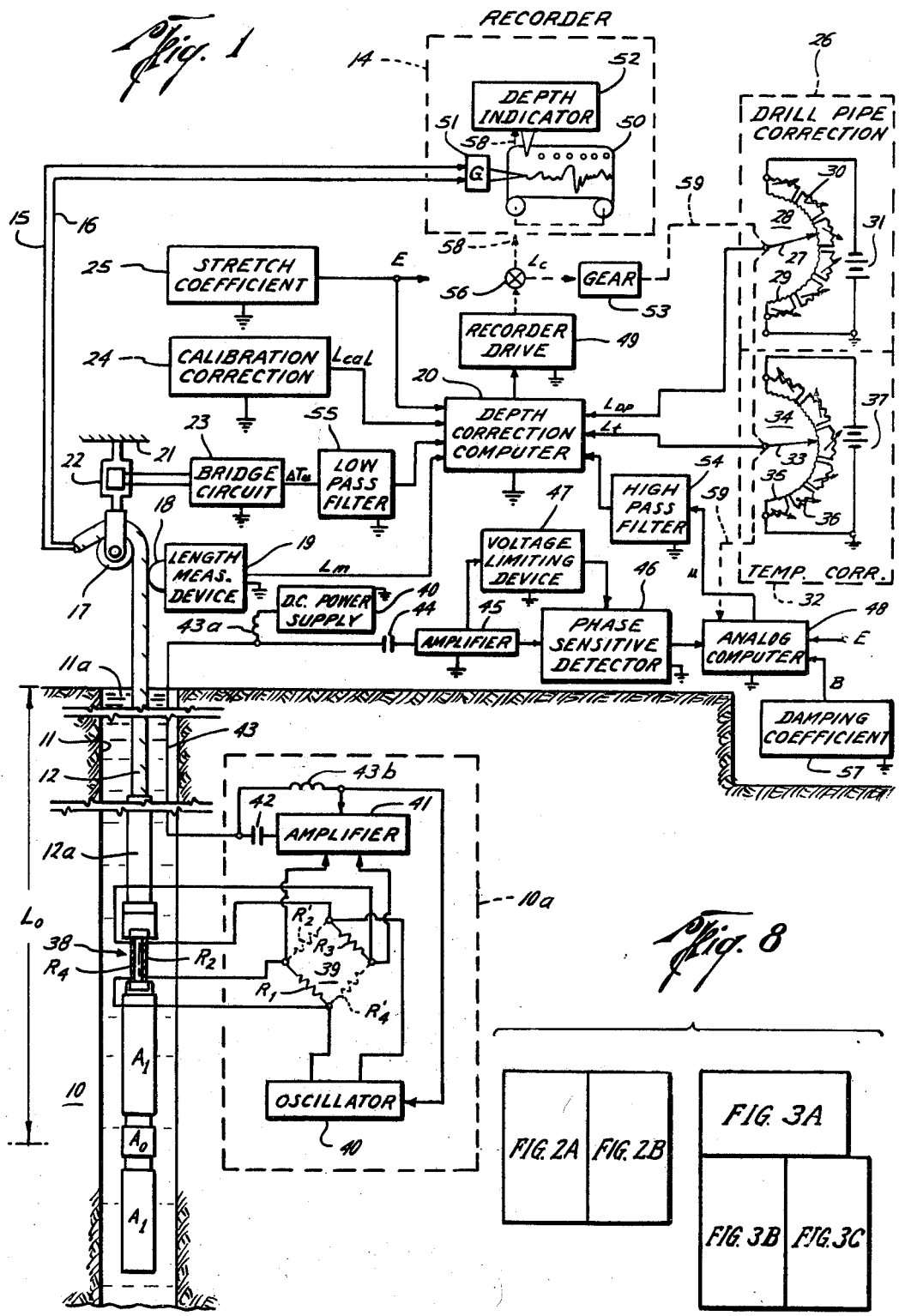

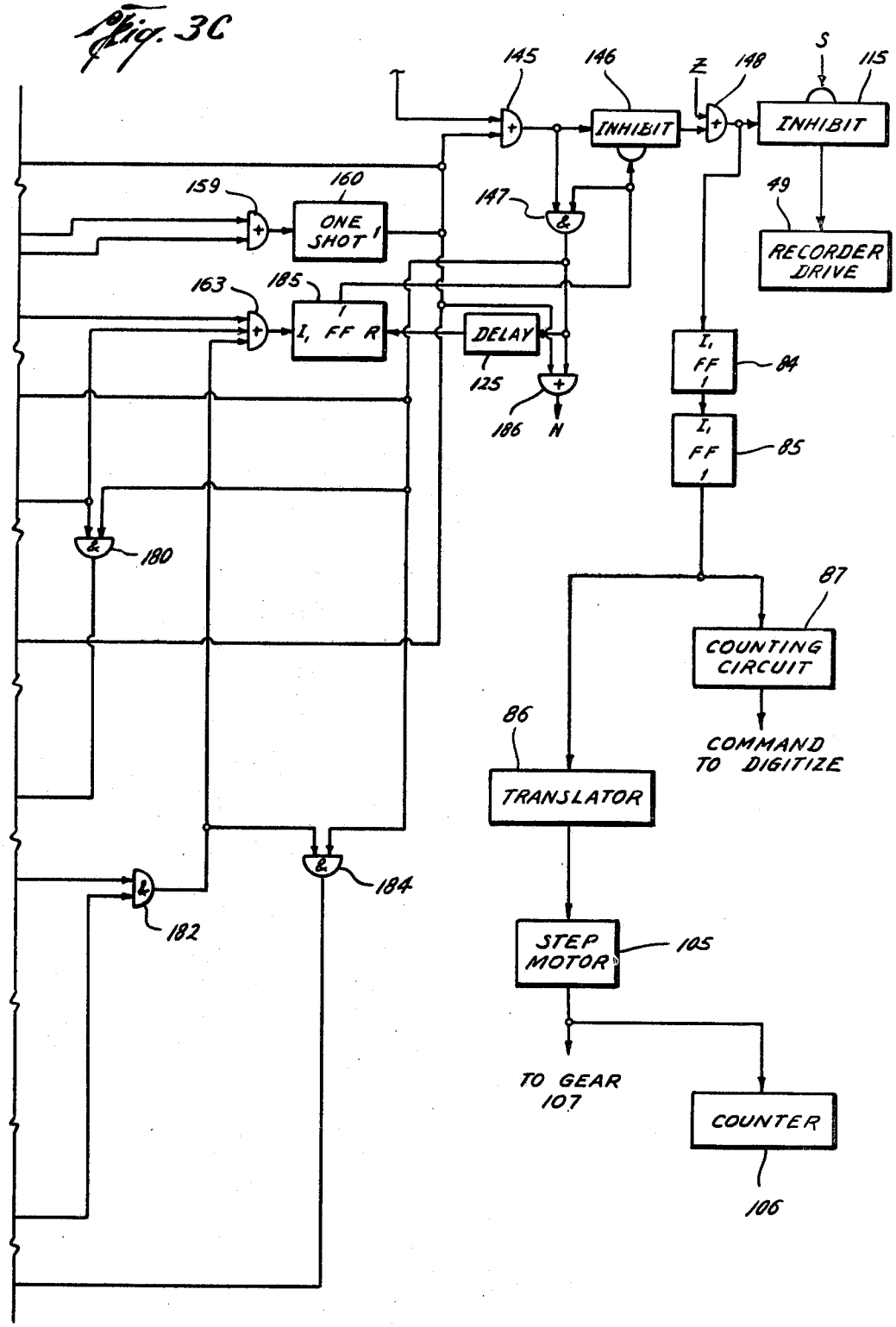

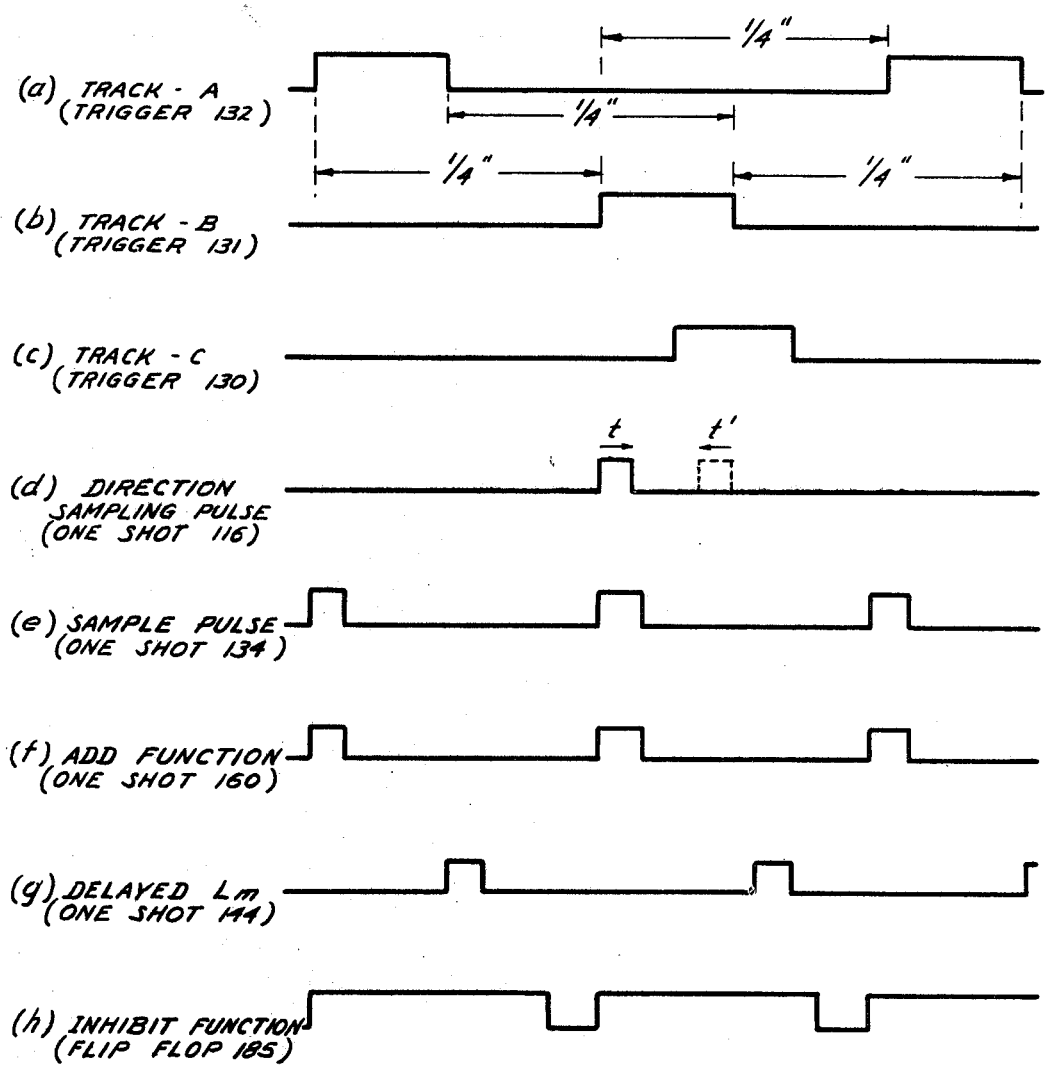

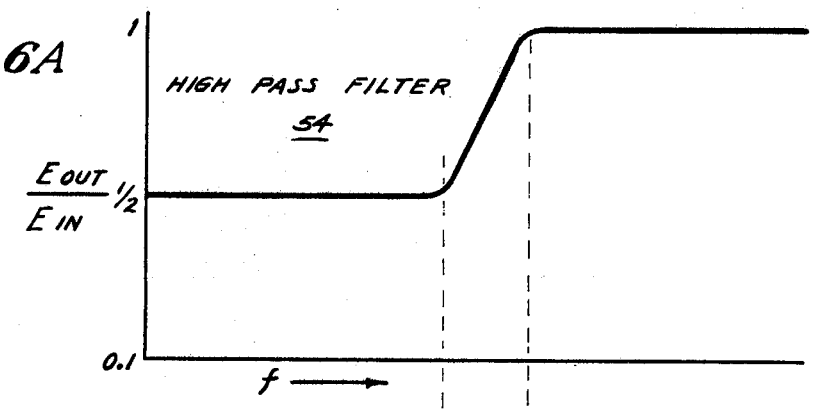
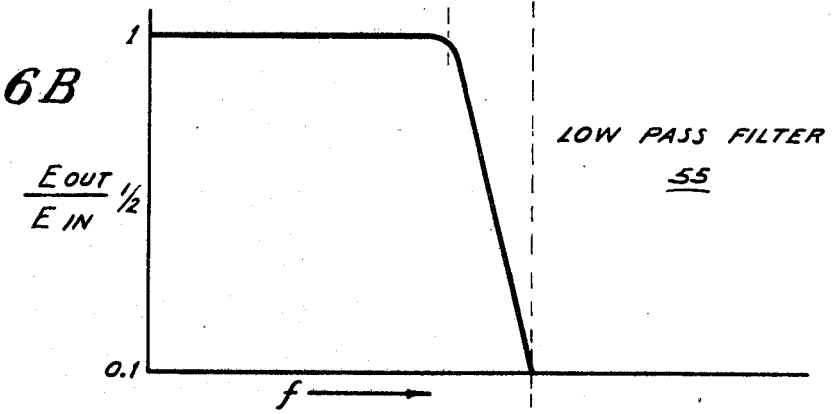
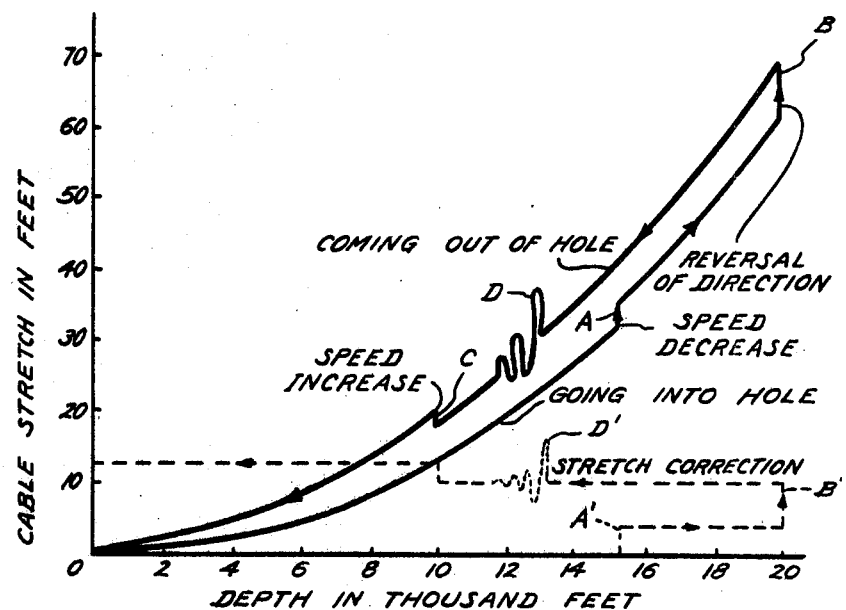

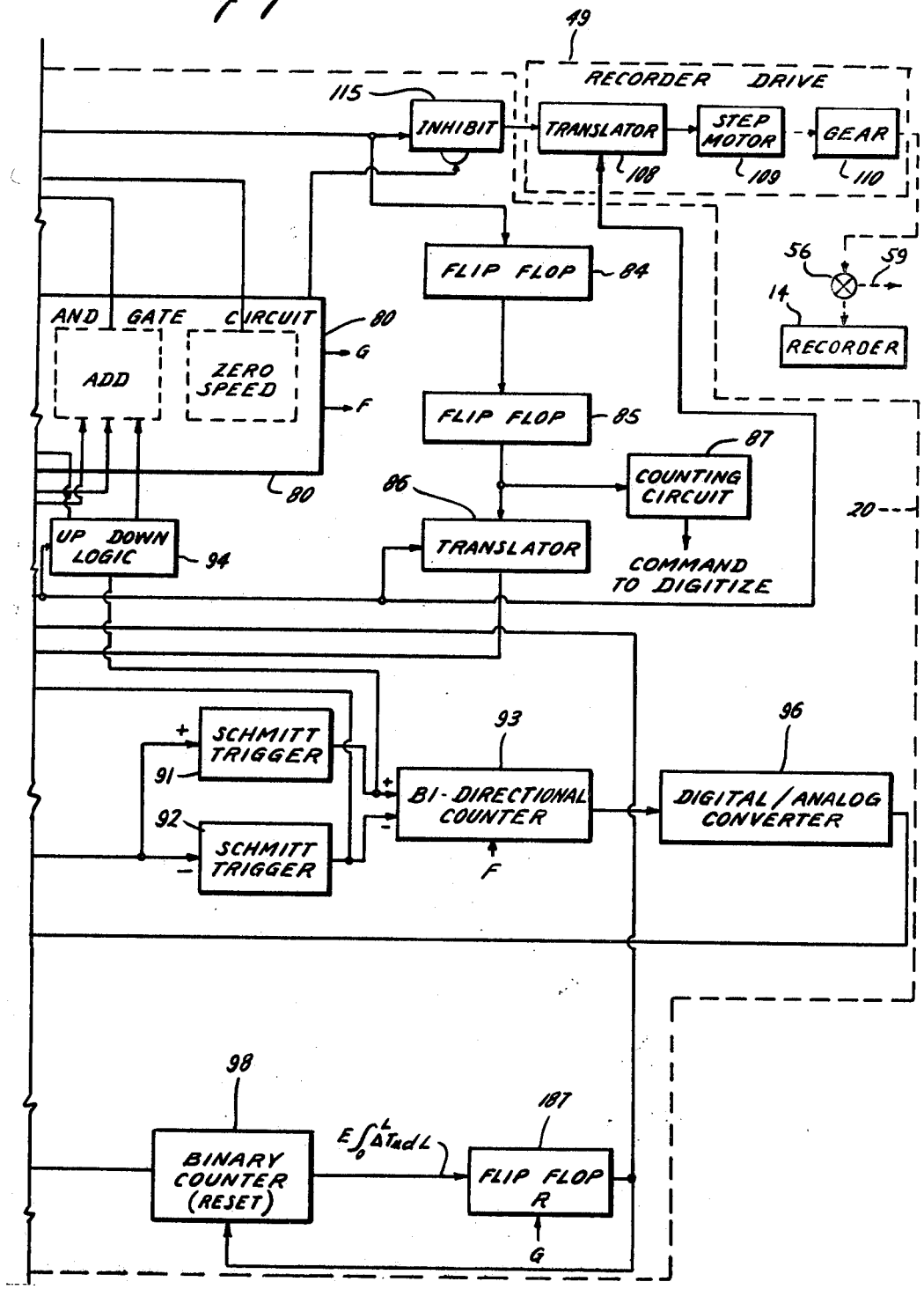

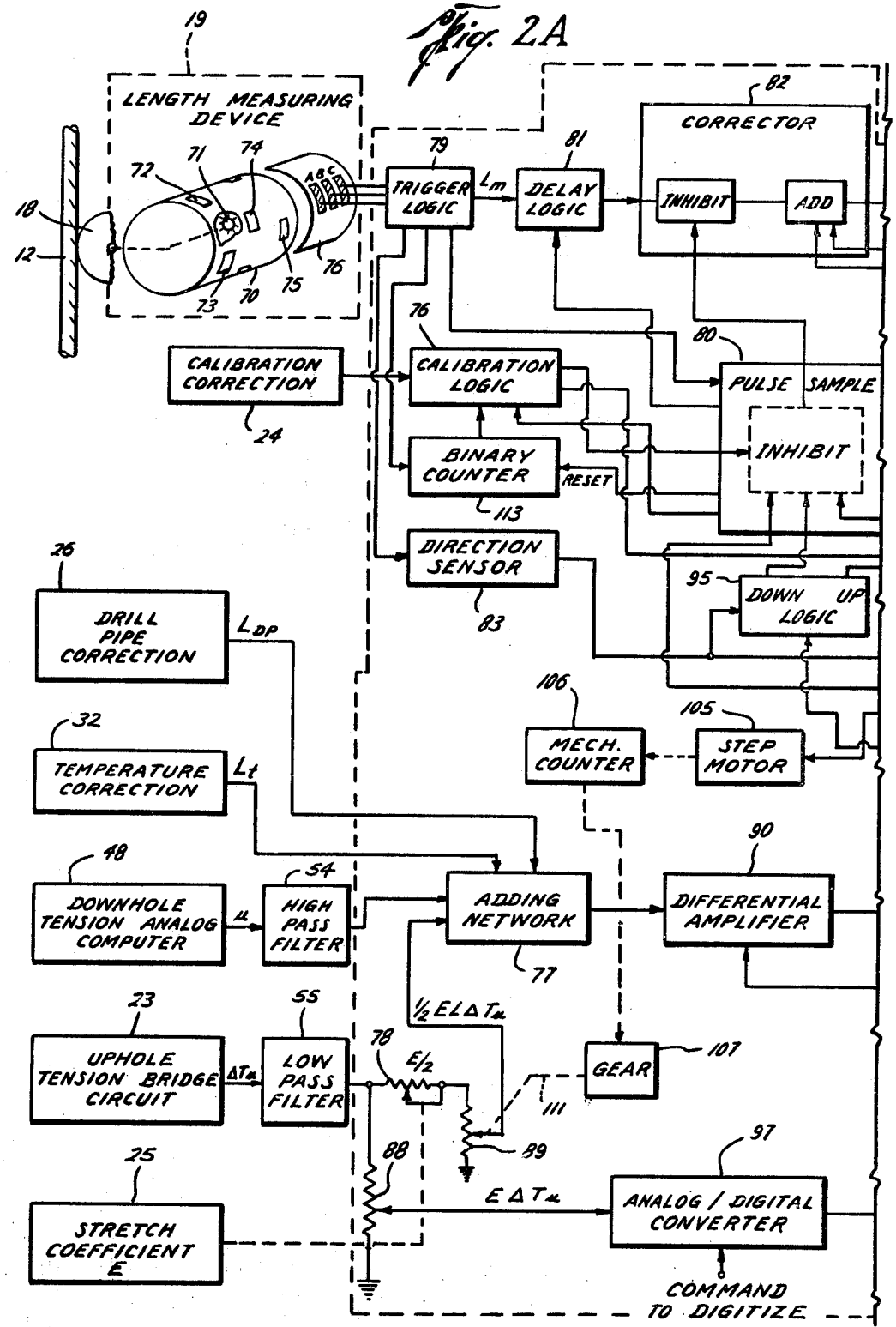

3,497,958
SYSTEMS AND METHODS FOR DETERMINING THE POSITION OF A TOOL IN A BOREHOLE
Lee H. Gollwitzer, Houston, Tex., assignor to Schlumberger Technology Corporation, Houston, Tex., a corporation of Texas
Filed May 2, 1966, Ser. No. 546,806
Int. Cl. G01b 5/04; E21b 47/00
U.S. Cl. 33—133  42 Claims

ABSTRACT OF THE DISCLOSURE

In accordance with an illustrative embodiment of the present invention, methods and apparatus are shown for continuously and accurately determining the position of a cable supported tool in a borehole. To accomplish this, the movement of the cable at the surface of the earth and the tension in the cable at the tool and at the surface of the earth are measured and combined in accordance with a given relationship to produce a corrected cable movement measurement. Additionally, a calibration correction function and a correction function for cable stretch with temperature can be utilized for additional depth correction. The accumulation of this corrected cable movement measurement will then give the position of the tool in the borehole. If desired, this position can be referred to a depth position corresponding to drill pipe length.

---

This invention relates to systems and methods for accurately and continuously determining the length of an elastic cable under tension, and more particularly, to systems and methods for determining the true position of a tool or device suspended on the end of an elastic cable, as the tool or device on the end of the cable is moved up and down.

This invention is particularly adapted for use in the logging of an earth borehole where measurements of the surrounding subsurface earth formations are taken at different depths throughout the borehole by means of a measuring device which is lowered into the borehole at the end of a supporting cable extending from the surface of the earth. Typically, the measurements taken along the length of the borehole are intended to provide indications of oil or gas bearing strata. Therefore, the depth of the logging or measuring device below the surface of the earth must be accurately determined at all times so that the measurements may be accurately correlated with the true depth of the logging or measuring device.

To determine the depth of the logging or measuring device in the borehole, a means of determining the length of cable that is lowered into the borehole may be utilized to count the actual number of feet of cable lowered into the borehole by a cable reeling device located at the surface of the earth. Many systems have been proposed for measuring this cable length, and thus the position of the measuring or logging device within the borehole. Some of these are sheave devices located at the surface of the earth which provide a measurement of the length of cable which passes over the sheave. Other systems utilize a sensing device responsive to magnetic marks on the cable along the length of the cable, which systems measures the length between the magnetic marks as the cable is payed out or taken in.

However, there are forces at work on the measuring or logging device within the borehole which sometime cause these cable length indicating devices at the surface of the earth to give readings which do not have the desired accuracy. Some of these forces include the weight of the measuring or logging device and the weight of the cable which connects it to the cable reeling device at the surface of the earth, the buoyant force of the drilling liquid or mud in the borehole, and the drag or frictional forces applied by both the drilling liquid or mud and by the wall of the borehole to both the cable and the measuring or logging device.

When investigating earth formations surrounding the borehole, the measuring or logging device is generally lowered to the bottom of the borehole and the logging measurements are taken as the logging device moves up the borehole. However, when the cable reeling device at the surface of the earth is stopped upon reaching the vicinity of the hole bottom, the logging device at the end of the great length of cable will continue moving downward for some distance due to the forces acting on the logging device and cable, and the elasticity of the cable. However, the depth indicator at the surface of the earth will stop at the moment the cable reeling device is stopped. As a result, the depth indicating device at the surface of the earth will given an erroneous depth indication of the logging tool at the bottom of the borehole.

In addition, when the cable reeling device begins reeling the cable in, thus moving the logging tool up the borehole, the forces acting on the logging tool and the cable will cause the cable to stretch, thus causing the logging tool to be located at a different depth than the depth indicated on the depth indicating device at the surface of the earth. Also, when the cable reeling device changes speed, the logging tool tends to change to a different depth than that indicated on the depth indicating device.

These errors introduced by the stretching of the cable can be excessive for the accurate determination of the depth of oil-bearing strata. Oil-bearing strata may be two or three feet or less in thickness in many cases. Since the error of the depth indicating system can in some cases be several feet, the subsequent perforation operation performed during the well-completion stage may miss the oil-bearing strata.

Various systems for obtaining the average depth error of a logging device on the end of an elastic cable in a borehole have been proposed. One proposed way in which an average measure of depth error is obtained is by inserting magnetic marks on a cable which has a fixed force on the end thereof, thus placing a fixed tension on the cable. These magnetic marks are inserted at definite intervals along the length of the cable and counted as the cable is reeled in or out at the surface of the earth. The depth indicated by the magnetic marks are then combined with a cable tension measurement made at the surface of the earth to provide a depth correction. Such a system is shown in U.S. Patent No. 3,067,519 granted to G. Swift on Dec. 11, 1962.

Another surface-located cable tension method for providing an average correction of depth errors is shown in U.S. Patent No. 3,027,649 granted to Raymond W. Sloan on Apr. 3, 1962.

However, there are serious errors which may occur when these previously-proposed systems are utilized. For example, when the logging device becomes momentarily stuck against the wall of the borehole as the device is moving through the borehole, the logging device will be at a constant depth, while at the same time the depth indicator at the surface of the earth is continually moving, thus introducing an excessive error into the indicated depth. On the other hand, when the logging device becomes unstuck, the elasticity of the cable will cause the logging device to move at a great rate beyond the depth indicated by the depth measuring device at the surface of the earth, and will frequently oscillate before reaching equilibrium.

The previously-proposed depth measuring systems can only provide an average measure of the depth changes encountered by the logging device in the borehole because they utilize only measurements made at the surface of the earth and because thousands of feet of cable usually separate the downhole logging device and the surface-located cable measuring devices. For example, a force applied at the logging device in the borehole would not appear immediately at the surface of the earth in the form of a change in tension because of the great length of cable, and the measured force appearing at the surface of the earth in the form of a tension measurement would be distorted because of damping by the cable. These tension variations occurring at the logging device within the borehole may be delayed by as much as several seconds from reaching the surface of the earth due to this travel time in the cable.

Thus, it can be seen that a device located at the surface of the earth for measuring depth error by the method of transferring the force from the logging device within the borehole through the cable to the surface of the earth, does not give an instantaneous indication of the true depth location of the logging device within the borehole. At best, it can only give an average type indication.

Aside from instantaneous indications of depth, when only a surface tension measurement is utilized, the tension existing at the bottom of the cable in the borehole can only be assumed to be constant at a particular predetermined reference tension which has been chosen before a logging run into the borehole. But, as a matter of fact, the tension existing on the bottom portion of the cable does not necessarily remain at the predetermined reference tension due to, among other things, the cable and tool dragging against the side of the borehole.

Other problems may also be encountered when using a surface depth measuring system. When the earth strata surrounding the borehole are investigated, the location and quantity of oil cannot always be determined by any one investigating method. In many cases, several different investigating methods have to be utilized and the data obtained therefrom combined and analyzed before an oil-bearing strata can be located. Existing apparatus for carrying out these different investigating methods sometimes cannot all be lowered into the borehole at the same time. Thus, the various logging tools must sometimes be lowered into the borehole at different times and on different logging runs. To combine all of the various logging readings made by the different investigating tools in such a manner as to determine the exact location of oil-bearing strata, the depth indications of each logging run must correlate very accurately with one another or else the combination, analysis, and computation of the different measurements taken with different measuring or logging tools will not provide the desired result. To combine these various logging runs in such a way that the computations taken therefrom will provide the desired information, the depth indications from the various logging runs must be accurate to within approximately several inches or less of one another.

One present-day example of multiple logging runs in the same borehole concerns the automatic computation of the apparent resistivity $R_{wa}$ of the naturally occurring water within the porous formations surrounding the borehole. To obtain $R_{wa}$, a previously-recorded induction log run is played back in depth synchronism with a sonic log being presently run. The sonic and induction log data are continuously fed to a computer to calculate the value of $R_{wa}$, and the computed $R_{wa}$ is simultaneously recorded with the sonic log. It can be seen that the depth of the sonic and induction logs must be accurate with respect to one another to obtain an accurate calculation of $R_{wa}$.

It is also desirable to have an accurate indication of the velocity of the measuring or logging tool moving through the borehole. For example, when a dipmeter is run through the borehole to determine the dip of the adjacent earth strata, that is, the angle that the bedding plane of the earth strata differs from the horizontal, the distance M between signal indications on different circumferential points around the borehole is obtained by moving the dipmeter across a boundary between different earth strata having different resistivity characteristics. This distance M is given by the formula:

$$M = M_r \cdot \frac{V_d}{V_r}$$

where M is the actual distance between the indications, $M_r$ is the indicated distance between the indications, $V_r$ is the indicated velocity of a recorder located at the surface of the earth, and $V_d$ is the average velocity of the dipmeter tool over the interval between the indications. It can be seen that if the actual velocity of the dipmeter is different from the recorder velocity, the error in M will be given by the formula:

$$\frac{M - M_r}{M_r} = \frac{V_d - V_r}{V_r}.$$

Thus, when the actual velocity of a dipmeter tool is different from the recorder velocity, an error in the computed dip of the earth bed will occur. If, however, the actual instantaneous depth error is corrected, the velocity error will also be automatically corrected.

When determining the depth of the logging tool within the borehole, it is desired to have the device at the surface of the earth which measures the length of cable reeled in or out, to provide indications of the length of cable at very short intervals, as for example, one-quarter inch, so that the depth correction can be made at shorter intervals. However, if there is a very small error present at each one-quarter inch indication from the surface cable length measuring device, it will accumulate to a substantial depth error when multiplied by thousands of feet. Snch a small error could arise from manufacturing tolerances in the device. Thus, it would be desirable to provide a means to periodically correct for any depth error caused by the cable length mesuring device at the surface of the earth.

It has been found that the elongation of the cable also depends upon the temperature within the borehole. This borehole temperature increases as the depth in the borehole increases. Thus, it would be desirable to provide a means to correct for cable stretch due to the borehole temperature as the logging tool is raised or lowered in the borehole.

Additionally, the borehole depth is usually referred to the total depth as determined by the lengths of drill pipe used to drill the hole, the length of each drill pipe being measured at the surface of the earth without pressure or temperature forces acting on it. Thus, this drill pipe determined total depth will not correlate accurately with the true depth within the borehole. Since the drill pipe depth frequently is the depth utilized in perforating oil-bearing strata, the actual true depth must be referred to the drill pipe depth. The difference between drill pipe depth and the true or actual depth will increase as the depth of the borehole increases. Thus, it is desirable to provide a means to correct for this drill pipe depth error as the depth of the borehole increases and refer the true or actual depth to the drill pipe depth.

It can be seen from the foregoing that many factors should be taken into consideration in order to arrive at a highly accurate indication of borehole depth. The actual length of cable passing over a given point at the surface of the earth should be combined with a function representing the tension on the cable at the surface of the earth and a function representing downhole tension to obtain both the average and the instantaneous value of depth caused by changes in tension. These factors should be combined with a function representing correction of the length measuring device at the surface of the earth caused from inaccurate manufacturing tolerances, a function representing the change in length of the logging cable due to downhole temperature, and a function representing a correction due to referring the actual true depth to the drill pipe depth. It would entail a great amount of difficulty and inaccurateness to provide separate means for each and every one of the above corrections. It would therefore be desirable to provide one device for continously and automatically correcting for all of the above-mentioned sources of depth error and to provide one output to drive a recorder in accordance with the desired value of depth.

It is an object of the invention therefore, to provide new and improved methods and apparatus for determining the true depth of a device in a borehole.

It is another object of the invention to provide new and improved methods and apparatus for correcting the depth error caused by the average stretch of a cable used in a borehole.

It is still another object of the invention to provide new and improved methods and apparatus for correcting the depth error caused by instantaneous changes of force acting on a cable and tool within a borehole.

It is still another object of the invention to provide new and improved methods and apparatus for correcting for the stretch of a cable caused by temperature variations within the borehole.

It is still another object of the invention to provide new and improved methods and apparatus for correcting for depth errors caused by erroneous cable length indications from a device at the surface of the earth, which device determines the length of a cable reeled in or out at the surface of the earth.

It is still another object of the invention to provide new and improved methods and apparatus for referring true depth measurements to drill pipe depth measurements.

It is still another object of the invention to provide new and improved methods and apparatus for correcting the depth indication provided by a cable-measuring device that determines the length of cable being reeled in or out at the surface of the earth wherein such depth correction is obtained from the tension on the cable at the surface of the earth, the tension on the cable at the downhole end thereof, a calibration correction for the cable-measuring device, the depth error caused by stretch of the cable due to temperature variations within the borehole, and a correction obtained from referring the true depth to the drill pipe depth.

It is still another object of the invention to provide new and improved methods and apparatus for automatically and continuously providing highly accurate borehole depth indications.

In accordance with one feature of the invention, a system for determining the position or changes in position of a tool in a borehole comprises means for generating a first signal representative of the length or amount of movement of cable payed out and taken in at the surface of the earth as the tool is lowered and raised in the borehole and means for measuring the tension in the cable at the surface to produce a tension signal. The system further comprises means separate from said tension measuring means for generating a second signal representative of a characteristic which affects a desired cable length indication, said characteristic causing said cable length or movement indicated by said first means to be different from a desired cable length indication, and means for generating a third signal derived from said first, second, and tension signals and representative of the position or changes in position of a cable supported tool. Among the cable length characteristics are tension, temperature, calibration, and a factor for referring true depth to drill pipe length.

In accordance with another feature of the invention a method of determining the position or changes in position in a borehole of a tool comprises generating a first signal representative of the length or amount of movement of cable payed out and taken in at the surface of the earth as the tool is lowered and raised in the borehole and measuring at least a fraction of the tension in the cable at the surface of the earth to produce a tension signal. The method further comprises measuring a characteristic which affects a desired cable length indication, generating a second signal representative of the measured characteristic, and generating a third signal derived from said first, second and tension signals and representative of the position or changes in position of a cable supported tool. It will be appreciated that since the tool is located at the end of the cable, cable length and tool position are synonymous and can be used interchangeable throughout the specification and claims.

For a better understanding of the present invention, together with other and further objects thereof, reference is had to the following description taken in connection with the accompanying drawings, the scope of the invention being pointed out in the appended claims.

Referring to the drawings:

FIG. 1 is a schematic illustration showing one embodiment of the present invention;

FIG. 2 is a more detailed schematic diagram of portions of the FIG. 1 apparatus and is divided into FIGS. 2($a$) and 2($b$);

FIG. 5 is a graph showing the stretch of a cable versus the depth of a logging tool within the borehole under typical borehole conditions;

Figure 3B:
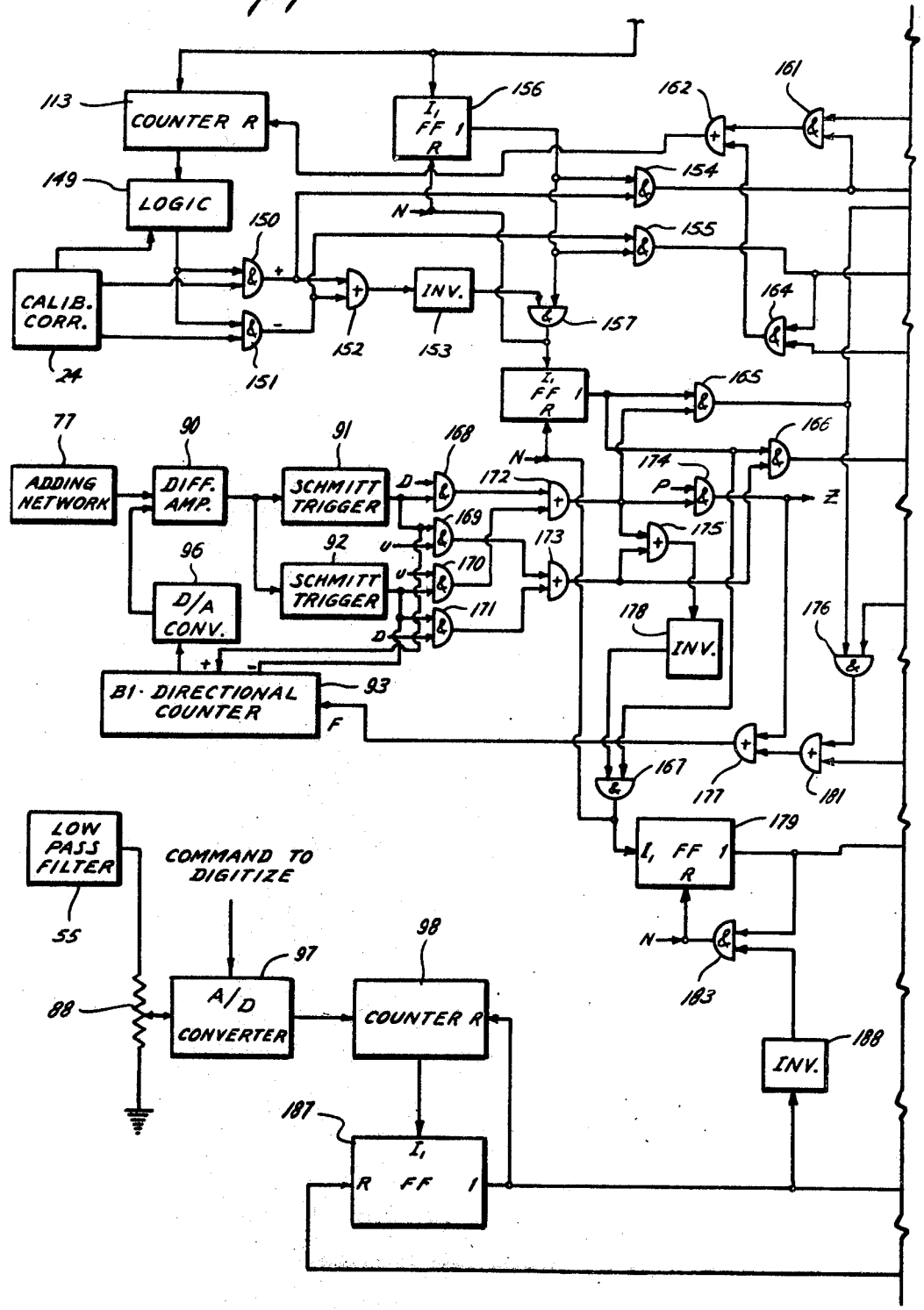
FIG. 3 is a schematic diagram showing portions of the FIG. 1 and FIG. 2 apparatus in still greater detail and is divided into FIGS. 3($a$), 3($b$) and 3($c$)
Figure 3A:
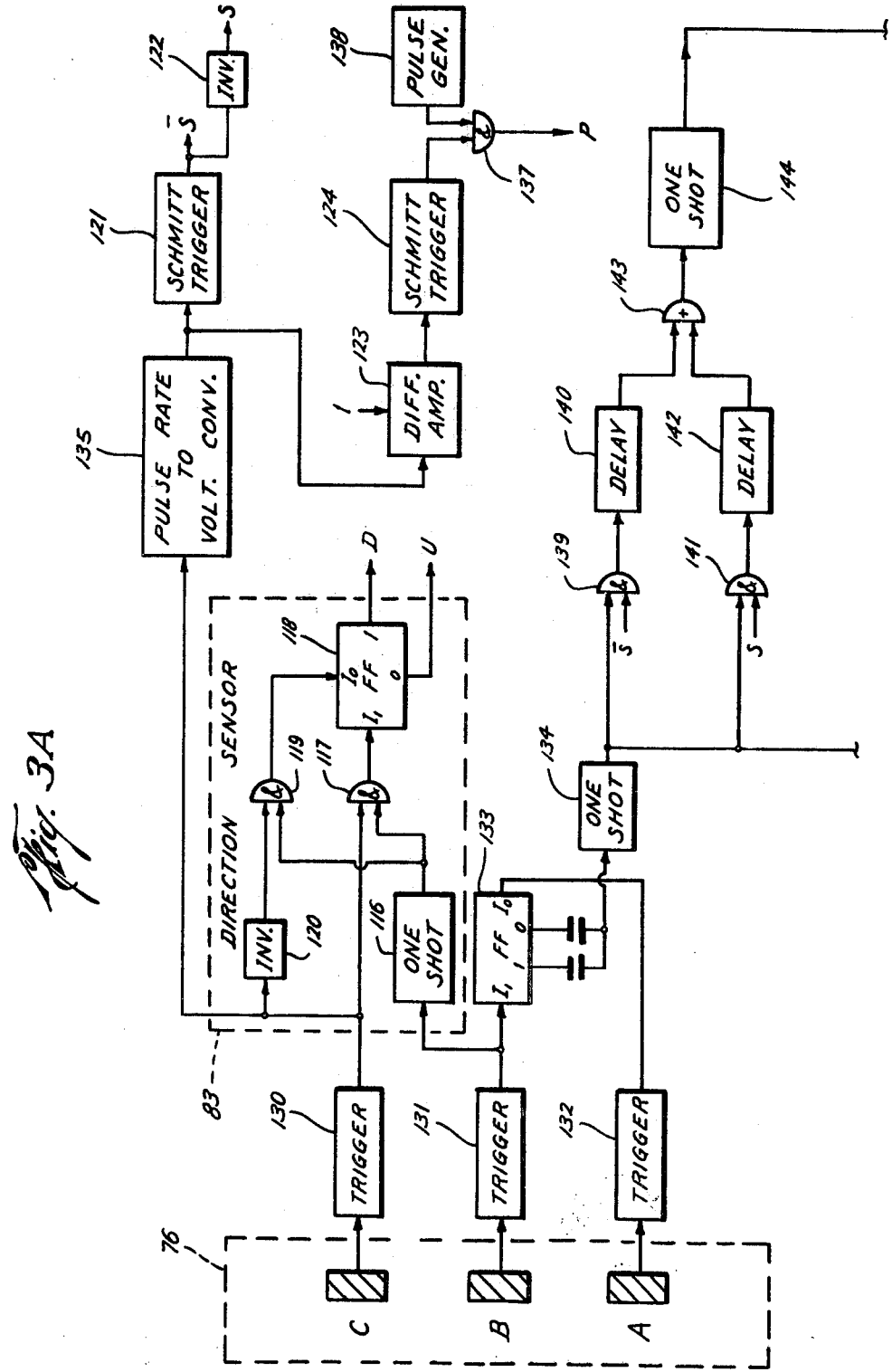

FIGS. 6($a$) and 6($b$) are log-log graphs showing the frequency response of certain filters to be utilized with the present invention;

FIGS. 7($a$)–7($h$) are timing diagrams illustrating electrical pulses at various points within the FIGS. 1–3 apparatus; and FIG. 8 represents how FIGS. 2($a$) and 2($b$) and FIGS. 3($a$), 3($b$) and 3($c$) are to be positioned to obtain single representations of FIGS. 2 and 3.

Referring to FIG. 1 of the drawings, there is shown a representative embodiment of apparatus constructed in accordance with the present invention for continuously and automatically providing corrected indications of depth of a logging device 10 lowered in a borehole 11 filled with a drilling mud 11$a$ for investigation of the earth formations surrounding the borehole 11. The logging tool 10 is a three electrode focused electrical logging system wherein a survey current is emitted from a central survey electrod $A_0$ and is confined to a path horizontally outward from the borehole 11 by focusing currents emitted from focusing electrodes $A_1$ located above and below electrode $A_0$. Thus, the portion of the surrounding earth formations that are investigated are those portions adjacent to central survey electrode $A_0$. It can be seen that only a small vertical portion of the surrounding earth formation is investigated at any one time and thus, the depth of central survey electrode $A_0$ must be accurately known before any oil-bearing earth strata indicated by the logging tool can be accurately penetrated. The three electrode focused system 10 shown in FIG. 1 is only an illustration example and any type of logging tool could be utilized in place thereof.

During a typical logging run, measurement signals are supplied to a recorder 14 by way of conductors 15 and 16 running through armored multi-conductor cable 12 to electrical measurement circuitry contained within a housing unit 10$a$ within the logging tool 10. If, now, the logging tool 10 were withdrawn from the borehole 11 after a first logging run and another logging run made with another type of logging tool, as for example, a sonic or induction logging tool, the sonic or induction log should be recorded in depth synchronism with the previously run log. The depths on the two logs must coincide exactly in order for the information obtained from both of the logs to be combined by a computer and provide accurate computations.

As the cable 12 is reeled in and out of the borehole 11 over an idler-pulley 17 by means of a suitable drum and winch mechanism (not shown) located at the surface of the earth, a length indicating wheel 18 rotates with the movement of cable 12. Thus, the rotation of wheel 18 is proportional to the length of cable 12 that moves past wheel 18. Wheel 18 is connected to a length measuring device 19 which provides depth indications to a depth correction computer 20. The idler-pulley 17 is mechanically connected to a rigid member 21 by a tension measuring device 22 such that the full force exerted on idler-pulley 17 by cable 12 and tool 10 is exerted on tension measuring device 22. Tension measuring device 22 is electrically connected to a bridge circuit 23, whose electrical output is connected to an input of a low-pass filter 55. The electrical output of low-pass filter 55 is connected to a input of a multiple-input of depth correction computer 20. A calibration correction means 24 and a stretch coefficient input means 25 are connected to additional inputs of depth correction computer 20.

Connected to a further input of depth correction computer 20 is a drill pipe correction means 26. The voltage on the wiper arm of a potentiometer 28 provides the output from drill pipe correction means 26 to depth correction computer 20. The resistance portion 29 of potentiometer 28, which wiper arm 27 contacts, has a plurality of variable resistors 30 connected in parallel across segments of the resistance portion 29 of potentiometer 28. Connected across the ends of the resistance portion 29 of potentiometer 28 is a battery 31, the positive terminal of which is connected to ground.

Connected to another input of depth correction computer 20 is a temperature correction means 32. The output to depth correction computer 20 from temperature correction means 32 is supplied from the wiper arm 33 of potentiometer 34. The resistance portion 35 of potentiometer 34 has a plurality of variable resistances 36 connected across segments of resistance portion 35. Connected across the ends of resistance portion 35 of potentiometer 34 is a battery 37, the negative terminal of which is connected to ground.

Looking now at the downhole tension portion of the FIG. 1 apparatus, there is shown a downhole tension device 38 connected between the logging device 10 and the cable 12. Tension device 38 has two semi-conductor strain gage elements, $R_2$ and $R_4$ which vary in resistance as the tension between cable 12 and tool 10 varies. Strain gage elements $R_2$ and $R_4$, which are preferably of the semi-conductor type SPB3–12–100C6, manufactured by Baldwin-Lime-Hamilton are connected to the bridge circuit 39, which comprises resistors $R_1$ and $R_3$ along with the semi-conductor strain gage elements $R_2$ and $R_4$. The semi-conductor strain gage elements $R_2$ and $R_4$ are represented in bridge circuit 39 by the dotted line resistances $R_2'$ and $R_4'$. The resistors $R_1$ and $R_3$ are also preferable of the semi-conductor type, used for temperature compensation.

A DC power supply 40 located at the surface of the earth supplies DC power via a conductor 43 to an oscillator 40 and an amplifier 41 located within the downhole housing unit 10a. Conductor 43 is actually contained within cable 12 but, for simplicity, is shown separately. A pair of inductors 43a and 43b, inductor 43a being connected between DC power supply 40 and conductor 43 and inductor 43b being connected between the DC power input to amplifier 41 and oscillator 40 and conductor 43, are utilized to isolate the DC and AC loads. One output of oscillator 40 is connected to the junction between resistor $R_1$ and semi-conductor strain gage element $R_4$ of bridge circuit 39. The other output of oscillator 40 is connected to the junction between resistor $R_3$ and semi-conductr strain gage element $R_2$. One input to amplifier 41 from bridge circuit 39 is connected to the junction between resistor $R_1$ and semi-conductor strain gage element $R_2$. The other input to amplifier 41 is connected to the junction between resistor $R_3$ and semi-conductor strain gage element $R_4$. The output from amplifier 41 is connected through a capacitor 42 to conductor 43. At the surface of the earth, a capacitor 44 is connected between conductor 43 and amplifier 45. One output of amplifier 45 is connected to a phase-sensitive detector 46. The other output from amplifier 45 is connected to a voltage-limiting circuit 47, the output of which is connected to phase-sensitive detector 46 to provide a phase-reference signal thereto. The output of phase-sensitive detector 46 is connected to the input of an analog computer 48 to which also is supplied a function indicative of the damping coefficient B from damping coefficient input means 57, which function is constant for a given borehole but varies from borehole to borehole. Also supplied to analog computer 48 is a function indicative of the cable stretch coefficient E from stretch coefficient input means 25, which function is constant for a given cable. The output of analog computer 48 is connected to a high-pass filter 54. The output of high-pass filter 54 is supplied to depth correction computer 20.

The output of depth correction computer 20 is supplied to a recorder drive 49 which converts the electrical output signal from depth correction computer 20 to a mechanical rotational output. This mechanical rotational output is supplied to a junction point 56. One output from junction point 56 drives a chart 50 within recorder 14 via shaft 58. Conductors 15 and 16, which provide the logging measurements from logging tool 10 within the borehole 11, are connected to a galvanometer unit 51 within recorder 14. The mechanical rotational output from junction point 56 via shaft 58 is also connected to a depth indicator 52 within recorder 14. Depth indicator 52 is adapted to provide depth indications on chart 50 at given intervals of depth, as for example, each complete rotation of shaft 58. The mechanical rotational output from recorder drive 49 is also connected through a reducing gear 53 to drive wiper arm 27 of potentiometer 28 within drill pipe correction means 26 and wiper arm 33 of potentiometer 34 within temperature correction means 32. Thus wiper arms 27 and 33 will rotate in direct relation to the rotational output of recorder drive 49. Shaft 59 is also connected to analog computer 48.

Now concerning the operation of the FIG. 1 apparatus, the rotating wheel 18 provides mechanical indications to the length measuring device 19 of the exact length of cable 12 which passes rotating wheel 18, and the direction in which cable 12 is moving, i.e., up or down. Length measuring device 19 transfers the rotation of rotating wheel 18 into electrical impulses indicating the length of cable 12 that is passing rotating wheel 18 and the direction of that travel, to depth correction computer 20. By accumulating these electrical impulses, the total measured length $L_m$ could be obtained.

Before discussing the correction by depth correction computer 20 of the measured length $L_m$, it is desirable at this time to discuss the equation which depth correction computer 20 must solve to provide the corrected depth. If the distance between the surface of the earth and the central survey electrode of logging tool 10 is considered as the true depth, $L_0$ of logging tool 10 in the borehole, it is known that, in most practical cases, some given length correction $\Delta L_m$ must be added to the measured length $L_m$, to obtain the true depth $L_0$ of logging tool 10. Thus, can be written the equation:

$$L_o = L_m + \Delta = L_m$$

It has been discovered that the relationship for the given additional length $\Delta L_m$ can be represented by the mathematical expression:

$$\Delta L_m = \left[\frac{1}{2}EL(\Delta T_u + \Delta T_d) - E\int_0^L \Delta T_u dL\right](f_L) + u_d(f_h) + L_t + L_{cal} \quad (2)$$

where

E is the stretch coefficient;
L is the cable length;
$\Delta T_u$ is the change in tension on the cable measured at the surface of the earth with respect to a known reference tension;
$\Delta T_d$ is the change in tension measured by a downhole tension device located between the tool and the bottom end of the cable with respect to a known reference tension;
$L_t$ is the stretch of the cable due to changes in temperature in the borehole;
$L_{cal}$ is the calibrated cable length correction caused by any inaccurateness of length measuring device 19;
$u_d$ is the change in cable length caused by a change in downhole tension $\Delta T_d$ as calculated by analog computer 48;
$f_L$ is a symbolic operator indicating a low frequency component (a term multiplied by the operator $f_L$ indicates that that term includes only low frequency components); and
$f_h$ is a symbolic operator indicating a high frequency component (a term multiplied by the operator $f_h$ indicates that that term includes only high frequency components).

Looking now at FIG. 5 there is shown a plot of cable stretch versus borehole depth for a typical run in the borehole 11. It can be seen that as the tool 10 is lowered into the borehole 11, the cable stretch increases. When the cable reeling device at the surface of the earth decreases in speed, there is a sudden change in cable stretch, as indicated at point A in FIG. 5. When the cable reeling device stops unreeling cable before reversing direction, as indicated at point B, there is another substantial change in cable stretch of cable 12. Likewise, when the cable reeling device increases speed when the tool 10 is coming out of the borehole 11, as indicated at point C, there is another sudden change in cable stretch. If there were no changes in speed or direction of the tool 10 traveling in the borehole 11, the measured length indications from rotating wheel 18 and length measuring device 19 of FIG. 1 would, after accumulation, indicate substantially accurately the true depth of the tool 10 in the borehole. However, speed changes, reversals of direction, and erratic tool motion cannot be sensed by rotating wheel 18 and length measuring device 19.

However, it is possible by utilizing an uphole cable tension measurement made at the surface of the earth to ascertain the average or steady state values of cable stretch caused by speed changes and reversals in direction. The exact instant of these occurrences cannot be accurately determined because of the delay caused by the long length of cable. Also, there are certain assumptions that must be made before a cable tension measurement at the surface of the earth can be accurately utilized to correct for cable stretch, which assumptions may be erroneous. It must be assumed that the increase in cable tension changes linearly with increasing distance from the lower end of the cable, and the drag forces acting on the cable above its midpoint will be of a magnitude corresponding with the drag forces acting on the cable below its midpoint.

To provide a more accurate determination of the steady state value of cable stretch and avoid erroneous assumptions, the apparatus of the present invention measures the tension at both ends of the cable 12 and averages the total. This operation is represented by the $$\tfrac{1}{2}EL(\Delta T_u + \Delta T_d)(f_L)$$

portion of Equation 2. The total ($f_L$) portion of Equation 2 provides the steady state correction of cable stretch due to tension.

Looking again at FIG. 5, there is shown at point D on the solid line cable stretch portion of FIG. 5. Point D represents the tool 10 becoming momentarily stuck on the wall of the borehole as it is being raised, and then becoming unstuck and oscillating before reaching equilibrium. Due to the long length of cable and the damping coefficient B of the cable, a surface tension measuring device might not sense this erratic tool motion, and at best, the tension arriving at the surface of the earth through the great length of cable, would be vastly distorted. To circumvent this potentially substantial type of depth error, the tension existing downhole at the tool is measured at the tool and transmitted instantaneously by distortionless electrical signals to the surface of the earth where the depth error caused by this erratic tool motion is calculated by an analog computer 48 and then supplied to the total depth correction digital computer 20 where it is combined with the other depth correction functions. Since the low frequency portion ($f_L$) of Equation 2 supplies the steady state depth correction, a high frequency component is added to such portion shown as $u_d(f_h)$ in Equation 2, to correct for erratic tool motion. $u_d(f_h)$ is the depth correction from analog computer 48 representing the instantaneous depth correction obtained from the downhole tension measurement.

Referring back to FIG. 1, the downhole tension function $\Delta T_d$ is obtained from the downhole tension measuring device 38 located between the logging tool 10 and the bottom of cable 12. A direct-current (DC) power supply 40 located at the surface of the earth supplies DC power through cable conductor 43 to amplifier 41 and oscillator 40 within downhole housing unit 10a. Oscillator 40 supplies a constant voltage alternating-current (AC) signal to bridge circuit 39, the output of which is supplied to amplifier 41. When the tension between tool 10 and cable 12 varies, the resistance of semi-conductor strain gage elements $R_2$ and $R_4$ varies proportionally to this tension. Looking at bridge circuit 39, where semi-conductor strain gage elements $R_2$ and $R_4$ are represented as dotted line resistors $R_2'$ and $R_4'$, it can be seen that as the resistance of $R_2'$ and $R_4'$ varies, the AC voltage applied from bridge circuit 39 to amplifier 41 will vary proportionally to this downhole tension. Since the resistance $R_2'$ and $R_4'$ of semi-conductor strain gage elements $R_2$ and $R_4$ are located diagonally opposite each other in bridge circuit 39, the voltage supplied to amplifier 41 is twice the magnitude as would be the case with only one semi-conductor strain gage element.

Amplifier 41 supplies an AC signal proportional to the voltage supplied from bridge circuit 39 through DC blocking capacitor 42, which capacitor is adapted to prevent DC power from reaching the output of amplifier 41. This AC tension signal from amplifier 41 is supplied via cable conductor 43 to amplifier 45 through capacitor 44, which capacitor is adapted to remove the DC power from the input to amplifier 45. By using capacitors 42 and 44 and inductors 43a and 43b, a single conductor 43 can be utilized both to supply DC power to the downhole tension circuit within housing unit 10a and to supply the AC signal proportional to downhole tension to amplifier 45. After amplification by amplifier 45, the downhole tension signal is applied to phase-sensitive detector 46. Another output from amplifier 45 is supplied to voltage-limiting circuit 47 whose output provides a phase-reference signal of constant voltage ot phase-sensitive detector 46. Phase-sensitive detector 46 detects the magnitude of the signal from amplifier 45 which is in-phase with the signal from voltage-limiting circuit 47 and supplies a resulting DC output signal proportional to tension to analog computer 48.

Before a logging operation begins, the tension signal output from phase-sensitive detector 46 is set at 0 volt by suitable means, as for example, an initial condition (IC) potentiometer included within phase-sensitive detector 46. This 0 voltage initial condition is set to correspond to a given reference tension from tension device 38, in this case, zero tension. Thus, the voltage output from phase-sensitive detector 46 will represent a change in tension $\Delta T_d$ from this reference tension. This downhole tension function $\Delta T_d$ is supplied to analog computer 48 where the depth error due to downhole tension is computed.

The relationship for the change in tension $\Delta T_d$ output from phase-sensitive detector 46 can be written as:

$$\Delta T_d = 0.4ML\ddot{u} + 0.4BL\dot{u} + \frac{1}{EL}u \qquad (3)$$

where $u$ is the depth error due to the change in downhole tension,
$\dot{u}$ is the first time derivative of the depth error $u$,
$\ddot{u}$ is the second time derivative of the depth error $u$,
M is the mass of the cable,
B is the damping coefficient,
E is the stretch coefficient of the cable,
L is the cable length.

Analog computer 48 solves Equation 3 and provides an output signal indicative of the depth error $u$. Since the E, B and L terms of Equation 3 are variable, means are provided to supply these to analog computer 48. Analog computer 48 will be explained in greater detail in connection with FIG. 4.

Now concerning the surface tension measurement, the apparatus for obtaining this measurement comprises tension device 22 and bridge circuit 23. The cable 12 is reeled in and out over idler-pulley 17. Any change in tension on cable 12 is transmitted to idler-pulley 17, which tension in turn is sensed by surface tension device 22. Surface tension device 22 forms a leg of a resistance bridge circuit within bridge circuit 23 in the same manner as bridge circuit 39 within downhole housing unit 10a. Bridge circuit 23 includes a power means which provides a DC output signal from bridge circuit 39 proportional to the tension on tension device 22. Like the downhole tension output from phase-sensitive detector 46, the surface tension output from bridge circuit 23 is set at zero volts when the tension on tension device 22 is at a reference tension, in this case, zero tension.

Now referring to Equation 2, there is a low frequency component $f_L$ and a high frequency component $f_h$ thereof. Since the average value of depth correction due to tension is only concerned with the low frequency component $f_L$, we must filter out the high frequency component $u_d(f_h)$ of Equation 2. Thus, at low frequencies representing the average value of depth change, the term $u_d(f_h)$ is dropped from Equation 2. However, at low frequencies, we still have a downhole tension term, $\frac{1}{2}EL\Delta t_d$ in Equation 2. Therefore, this term must be allowed to pass from analog computer 48 to depth correction computer 20 at low frequencies. However, looking at Equation 3 and dropping the high frequency terms $\dot{u}$ and $\ddot{u}$, it can be seen that the relation for the low frequency component of depth error $u_d$ is:

$$u_d(f_L) = EL\Delta t_d \qquad (4)$$

From Equation 2 it is seen that the low frequency component of downhole tension is equal to one-half the value represented in Equation 4. Therefore, we must filter the output of analog computer 48 in such a manner that at low frequencies, one-half of the output signal from analog computer 48 is applied to depth correction computer 20 and at high frequencies, the entire output of analog computer 48 is applied to depth correction computer 20. Looking at FIG. 1, there is shown a high-pass filter 54 between the output of analog computer 48 and depth correction computer 20 which performs this function. The gain versus frequency characteristics of high-pass filter 54 are shown in FIG. 6(a), in a log-log plot. From FIG. 6(a), it can be seen that one-half of the input voltage is passed at low frequencies, and the total input voltage is passed at high frequencies.

Referring back to Equation 2, it can be seen that the entire uphole tension component is utilized at low frequencies only. Thus, the output from uphole tension bridge circuit 23 that is applied to depth correction computer 20 must be at full value at low frequencies and reduced to zero at high frequencies. This function is performed by low-pass filter 55 which is connected between the output of uphole tension bridge circuit 23 and the input of depth correction computer 20. Looking at FIG. 6(b), there is shown the frequency response of low-pass filter 55, in a log-log plot. From FIG. 6(b), it can be seen that the total input voltage is blocked at high frequencies. It is seen that the frequency at which low-pass filter 55 changes the output from surface tension bridge circuit 23 from full value to zero is the same frequency at which high-pass filter 54 changes the output of analog computer 48 from one-half value to full value. This crossover frequency should be relatively low so that the downhole tension measurement will be fully effective over a wide range. A desirable value for this frequency has been found to be 0.1 cycle per second, for example.

Thus, by utilizing the uphole tension function in combination with a downhole tension function, the depth error caused from the total steady state cable stretch and the cable stretch due to erratic tool motion can both be accurately corrected. Alternatively, the filters 54 and 55 could be deleted by supplying $\Delta T_u$ in unfiltered form and designing analog computer 48 so that the downhole tension function takes into account the depth correction made by the surface tension function $\Delta T_u$.

Looking at Equations 2 and 3, there is shown a term E which represents the stretch coefficient of the particular cable being utilized. This value of stretch coefficient is constant for any given cable, but varies from cable to cable. The stretch coefficient for a given cable can be measured prior to being used in logging runs. Therefore, it is desirable to supply to depth correction computer 20, which solves Equation 2, and analog computer 48, which solves Equation 3, the correct value of the stretch coefficient E for the particular cable being utilized. Thus looking at FIG. 1, there is shown a means 25 for supplying the value of stretch coefficient E to depth correction computer 20 and analog computer 48.

The length measuring device 19 provides an output pulse at very short intervals of length, in this case, one-quarter of an inch. Even though measuring device 19 is reasonably accurate in the measurement of the length of cable 12 being reeled in or out of the borehole 11, a very small error present in each one-quarter inch length determination caused by manufacturing tolerances will become unreasonably high when the cable 12 is thousands of feet in the borehole 11. Thus it is desirable to calibrate length measuring device 19 and correct depth correction computer 20 according to this calibration. This is accomplished by determining the exact error involved over many thousands of feet of cable travel and inserting a calibration correction into depth correction computer 20 at certain intervals of length in accordance with this calibrated correction. This means is shown as calibration correction means 24 in FIG. 1, which supplies a function designated $L_{cal}$ to the depth correction computer 20.

A depth error can also be caused by high temperatures in the borehole 11 which causes an additional stretch of cable 12. The temperature within the borehole 11 varies with the depth of borehole 11. Thus when the logging tool 10 is at the top of the borehole, there will be little or no depth error caused by temperature, and when at the bottom of the borehole 11, the depth error due to temperature will be at a maximum. Thus, a means is required to provide a function to depth correction computer 20 which function increases as the depth of tool 10 within borehole 11 increases.

To accomplish this, a temperature correction means 32 provides an input signal $L_t$ to depth correction computer 20. This signal $L_t$ is derived from the wiper arm 33 of potentiometer 34. The resistance portion 35 of potentiometer 34 has a fixed value of resistance from one end of potentiometer 34 to the other end. However, before a logging run is made in the borehole, the temperature reading of the borehole is determined by suitable means, as for example, running a temperature transducer through the borehole. In practice, however, the temperature in the borehole is known with sufficient accuracy from prior readings from other boreholes in the area. The readings obtained from these temperature measurements can be utilized to adjust variable resistors 36, which variable resistors are in parallel with segments of the resistance portion 35 of potentiometer 34 to obtain the desired temperature correction curve.

Since this temperature correction varies with the depth of tool 10 within the borehole 11, the output of recorder drive 49, as taken from junction point 56 is connected through gear 53 to rotate the wiper arm 33. The rotation of the output shaft from recorder drive 49 is proportional to the corrected cable length. This mechanical output is connected through gear 53, which is geared such that the rotation of the output shaft from recorder drive 49 can be utilized with potentiometer 34. The battery 37 supplies a DC voltage between the end portions of the resistance portion 35 of potentiometer 34, with the negative terminal of the battery connected to ground. The wiper arm 33 is at the ground side of the resistance portion 35 of potentiometer 34 and moves toward the positive side thereof (counterclockwise in FIG. 1) as the tool 10 is lowered into the borehole 11.

Thus, the temperature correction to be applied to depth correction computer 20 will be zero when tool 10 is at the surface of the earth and will be at a maximum when tool 10 is at the bottom of borehole 11 since as the output shaft from recorder drive 49 rotates as the tool 10 is lowered into borehole 11, the wiper arm 33 will move in a counterclockwise direction, thus causing the voltage on wiper arm 33 to increase as the depth of tool 10 within borehole 11 increases. When the tool 10 is being raised in the borehole 11, wiper arm 33 will rotate in the opposite direction causing the voltage on wiper arm 33 to decrease.

Looking now at Equation 2, it can be seen that all of the terms thereof are applied to depth correction computer 20 in FIG. 1. Thus, from all of the above-described inputs to depth correction computer 20, Equation 1 can be solved to obtain the true depth of tool 10 within borehole 11. However, in some cases, the true depth is not the depth utilized in perforating an earth strata adjacent to borehole 11 to obtain the oil present therein. In some cases, the depth at which to perforate for oil flow is determined according to the length of drill pipe. This drill pipe length is measured as the drill pipe lays at the surface of the earth without tension in the drill pipe. However, when the drill pipe is in the borehole 11, the tension exerted by the weight of the drill pipe in the borehole along with the temperature in the borehole and other factors, causes the drill pipe depth to not coincide with the true depth.

Thus, it can be seen that a function to correct for this drill pipe error must be applied to depth correction computer 20, which function will be negative since length must be subtracted for drill pipe correction. This correction is applied by way of drill pipe correction means 26. The wiper arm 27 of potentiometer 28 within drill pipe correction means 26 provides a signal $L_{dp}$ to depth correction computer 20 to provide this correction. The potentiometer 28 within drill pipe correction means 26 operates in the same manner as potentiometer 34 within temperature correction means 32. The output of recorder drive 49 is applied through gear 53 to drive wiper arm 27. The resistance portion 29 of potentiometer 28 is a fixed value of resistance. However there are shown variable resistors 30 in parallel across given segments of resistance portion 29. These variable resistors 30 are adjusted before a logging run according to a drill pipe correction chart obtained from the driller or if none are available, according to a reasonable determination of drill pipe correction. When logging tool 10 is at the surface of the earth, wiper arm 27 will be at the ground side of the resistance portion 29 of potentiometer 28, thus providing zero volts to depth correction computer 20. As the depth of tool 10 within borehole 11 increases, wiper arm 27 will rotate in a counterclockwise direction, thus increasing the negative voltage applied to depth correction computer 20 from drill pipe correction means 26.

The equation for the output of depth correction computer 20 to recorder drive 49 representing the corrected depth indication $L_c$ (after accumulation of this output) can now be written as:

$$L_c = L_0 - L_{dp} \qquad (5)$$

where $L_{dp}$ is the drill pipe correction. Thus, the relationship for the corrected depth $L_c$ can now be written, combining Equations 1, 2 and 5 as:

$$L_c = L_m + \left[\frac{1}{2}EL(\Delta T_u + \Delta T_d) - \int_0^L E\Delta T_u dL\right](f_L) + u_d(f_h) + L_t + L_{cal} - L_{dp} \qquad (6)$$

Equation 6 thus represents the accumulated output of depth correction computer 20. The differential version of Equation 6 from computer 20 is applied to recorder drive 49, the mechanical rotational output of which is applied through junction point 56 to gear 53 and to recorder 14 by way of shaft 58. Shaft 58 provides the movement for chart 50 and also applies the mechanical input to depth indicator 52, which has a mechanism for indicating the depth on charge 50 at given intervals. The logging readings from logging tool 10 which are appled by conductors 15 and 16 to galvanometer 51 are recorded on chart 50. Thus it can be seen that the logging readings applied to chart 50 by galvanometer 51 are referred to the corrected depth as applied by depth indicator 52.

Any one of the above-described correction inputs are cable length characteristics, which characteristics cause the cable length indications from length measuring device 19, after accumulation, to be different from the desired cable length indication. Any one of the correction inputs could be utilized to correct for cable length indication errors without the other correction inputs. Thus, the calibration correction or drill pipe characteristic could be utilized without the temperature or tension characteristic, etc., but of course, the more characteristics that are used, the more accurate will be the cable length indication, the most accurate being when all of the characteristics are used. Thus, when only one characteristic is used, the desired cable length indication will be the combination of $L_m$ and the function derived from that one characteristic, and so on, with more than one characteristic.

Figure 4:
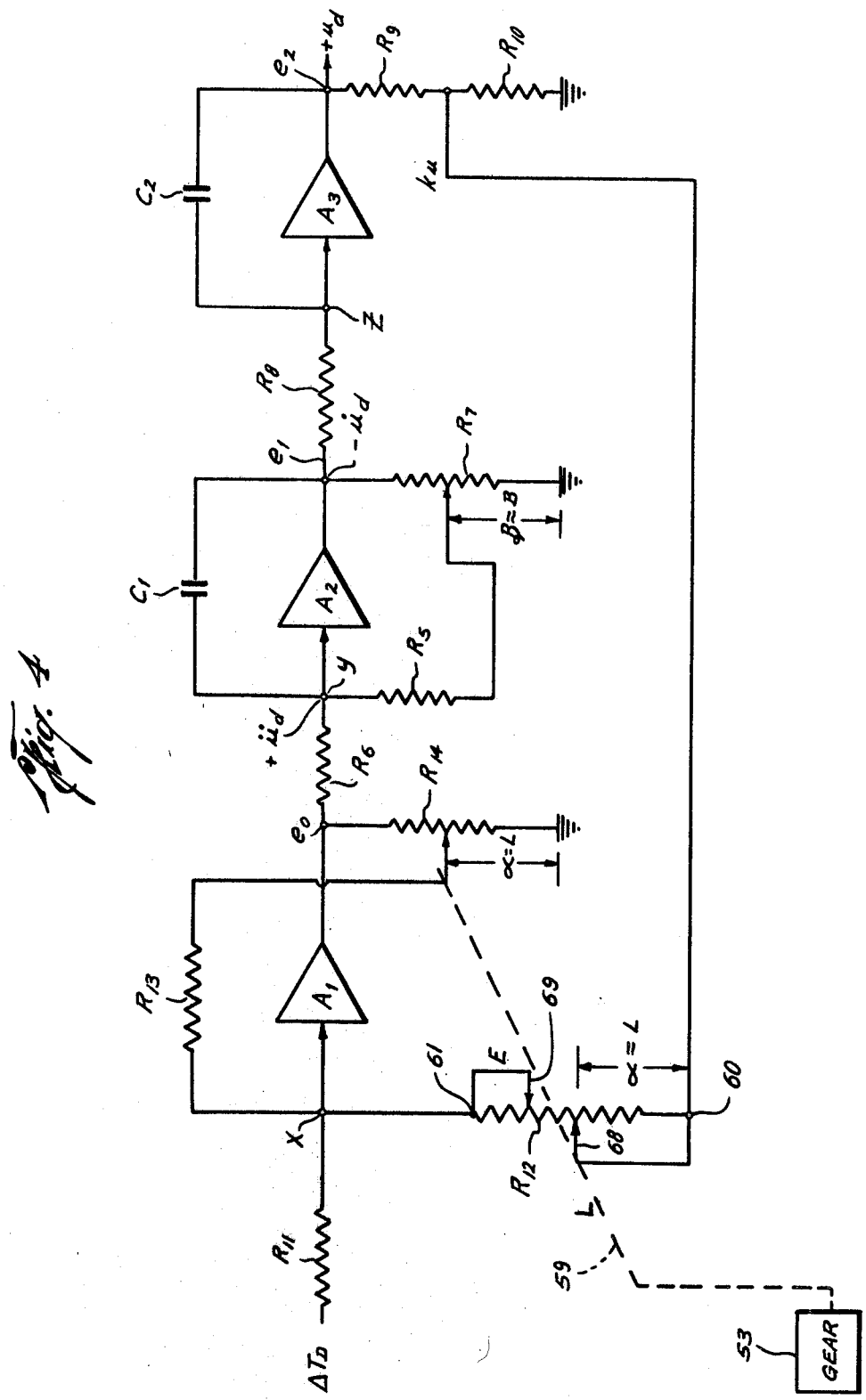
FIG. 4 is a circuit diagram of an analog computer circuit which may be utilized with the present invention.

Referring now to FIG. 4, there is shown the analog computer circuit 48. The output of phase-sensitive detector 46 of FIG. 1 is connected to a fixed resistor $R_{11}$, the other side of which is connected to a point X. The point X is connected to a high input impedance amplifier $A_1$, whose output is connected to one side of the resistance portion of a potentiometer $R_{14}$, the other side of the resistance portion of potentiometer $R_{14}$ being connected to ground. The wiper arm of potentiometer $R_{14}$ is connected through a fixed resistor $R_{13}$ back to the point X. The output of amplifier $A_1$ is also connected through a fixed resistor $R_6$ to a point Y. The point Y is connected to a high input impedance amplifier $A_2$. The output of amplifier $A_2$ is connected to one side of the resistance portion of a potentiometer $R_7$, the other side of the resistance portion of $R_7$ being connected to ground. The wiper arm of potentiometer $R_7$ is connected through a fixed resistor $R_5$ back to the point Y. The output of amplifier $A_2$ is also connected through a capacitor $C_1$ back to the point Y.

The output of amplifier $A_2$ is also connected through a fixed resistor $R_8$ to a point Z. The point Z is connected to the input of a high input impedance amplifier $A_3$, the output of which is connected through a voltage dividing network comprising resistor $R_9$ and $R_{10}$ to ground. The junction point between resistors $R_9$ and $R_{10}$ is connected to a first side 60 of the resistance portion of a potentiometer $R_{12}$, the other side of the resistance portion of potentiometer $R_{12}$ being connected to the point X. The first side 60 of potentiometer $R_{12}$ is also connected to a first wiper arm 68 of potentiometer $R_{12}$. The other side 61 of the resistance portion of potentiometer $R_{12}$ is also connected to a second wiper arm 69 of potentiometer $R_{12}$. The output of amplifier $A_3$ is also connected through a capacitor $C_2$ back to the point Z. The output of amplifier $A_3$ is also connected to the high-pass filter 54 of FIG. 1. The wiper arm of potentiometer $R_{14}$ and the first wiper arm 68 of potentiometer $R_{12}$ are rotated by the shaft 59 from gear 53 of FIG. 1. Thus, the wiper arm of potentiometer $R_{14}$ and the first wiper arm 68 of potentiometer $R_{12}$ rotate across the resistance portion of potentiometers $R_{12}$ and $R_{14}$ with the rotation of shaft 59.

Now concerning the operations of the analog computer circuit 48 of FIG. 4, analog computer 48 is adapted to solve Equation 3 and provide an output signal indicative of the depth error $u_d$. To solve Equation 3, a signal indicative of the second derivative $\ddot{u}_d$ of the depth error $u_d$ must be applied to a series of integrating circuits. Therefore, the second derivative $\ddot{u}_d$ of depth error $u_d$ must be solved from Equation 3, $$\ddot{u}_d = \frac{\Delta T_d}{.4ML} - \frac{B\dot{u}_d}{M} - \frac{ku_d}{.4ML^2E} \qquad (7)$$

The signal at the input to amplifier $A_2$ (point Y) will be considered as the second derivative $\ddot{u}_d$ of the depth error $u_d$. Thus, the signal at the output of amplifier $A_2$ will be the first derivative $-\dot{u}_d$ of the depth error $u_d$, and the signal at the output of amplifier $A_3$ will be equal to the depth error $u_d$. The voltage att the junction point between resistors $R_9$ and $R_{10}$ will be equal to $ku_d$ where $$k = \frac{R_{10}}{R_9 + R_{10}}$$

Thus, the $u_d$ portion of Equation 7 is multiplied by this constant, $k$. If now that portion of potentiometer $R_{12}$ between point 60 and wiper arm 68 and that portion of potentiometer $R_{14}$ between ground and the wiper arm are set equal to $\alpha$, and the total value of the resistance portion of potentiometer $R_{12}$ is set equal to the stretch coefficient E of cable 12 by adjusting wiper arm 69 of potentiometer $R_{12}$, can be written the relationship $$\frac{R_{13}}{\alpha R_{12}} = \frac{k}{.4ML^2E} \text{ and } \frac{R_{13}}{\alpha R_{11}} = \frac{1}{.4ML}$$

Thus, it is seen that the term $\alpha$ can be set proportional to the length L of cable 12 in the borehole, and the total value of $R_{12}$ is proportional to the stretch coefficient E of cable 12. If the segment of potentiometer $R_7$ between ground and the wiper arm thereof is designated as proportional to $\beta$, the relationship $$\frac{\beta}{R_5 C_1} = \frac{B}{M}$$

can be written. Thus, $\beta$ can be set proportional to the damping coefficient B. Therefore before logging a given borehole with a given cable, the value of the stretch coefficient of the cable E and the value of the damping coefficient B, can both be set by wiper arm 69 of potentiometer $R_{12}$ and the wiper arm of potentiometer $R_7$ respectively.

Since the cable length within the borehole 11 varies as the tool 10 is raised and lowered in the borehole 11, wiper arm 68 of potentiometer $R_{12}$ and the wiper arm of potentiometer $R_{14}$ are connected to shaft 59 from gear 53 so that the length term L can be continuously supplied to the analog computer 48. Thus, it can be seen that analog computer 48 solves Equation 3 and supplies a signal to high-pass filter 54 indicative of the depth error $u_d$.

Referring now to FIG. 2, portions of the FIG. 1 apparatus are shown in greater detail, which portions comprise the depth correction computer 20, length measuring device 19, and recorder drive 49. Referring first to length measuring device 19, there is shown the cable 12 in contact with the rotating wheel 18 in such a manner that when the cable 12 moves up or down, rotating wheel 18 will rotate with this movement of cable 12. Rotating wheel 18 is mechanically coupled to rotating drum 70 such that rotating drum 70 will rotate as the rotating wheel 18 turns. Located within rotating drum 70 and on the axis thereof is a light source 71. Located on the cylindrical surface of rotating drum 70 are a plurality of slits, only a few of which are shown. The illustrated slits are designated 72, 73, 74 and 75. All of the slits on the cylindrical surface of rotating drum 70 are divided into three tracks. Slit 72 and 73 on the extreme left are part of a first track A, slit 75 on the extreme right side of rotating drum 70 is part of a second track C, and slit 74 located intermediate of tracks A and C is part of a third track B. These slits extend around the total circumference of rotating drum 70.

Located a fixed distance from the cylindrical surface of rotating drum 70 is a sensing device 76 having three photocells thereon designated A, B and C. The photocells A, B and C are positioned with respect to tracks A, B and C on rotating drum 70 such that photocell A will only sense the light from light source 71 coming through those slits on track A, photocell B will only sense the light coming through those slits on track B, and photocell C will only sense the light coming through those slits on track C.

Looking now on the left hand side of FIG. 2 below length measuring device 19, there are shown means for supplying the input functions to depth correction computer 20. These input means are the same as those shown in FIG. 1 and have the same reference numbers as in the FIG. 1 apparatus. These input means comprise calibration correction 24 which supplies an input signal to a calibration logic circuit 76 within computer 20, drill pipe correction means 26 which supplies an input signal to adding-network 77 within computer 20, and temperature correction means 32 which also supplies an input signal to adding-network 77. These input means further comprise downhole tension analog computer 48 which supplies a signal to high-pass filter 54, the output of which is supplied to adding-network 77, and surface tension bridge circuit 23 which supplies an input signal to low-pass filter 55, whose output is supplied to the resistance portion of a potentiometer 78. The wiper arm of potentiometer 78 is controlled by a mechanical output from stretch coefficient input means 25, which could comprise, for example, a manually operated shaft 112 adapted to rotate the wiper arm of potentiometer 78.

The opposite side of the resistance portion of potentiometer 78 and the wiper arm thereof are connected to one side of the resistance portion of the potentiometer 89, the other side of the resistance portion thereof connected to ground. The wiper arm of potentiometer 89 is connected to an input of adding-network 77. Adding-network 77 is adapted to isolate the inputs supplied thereto from each other, while at the same time adding the respective signal inputs and applying one output signal to an input of differential amplifier 90. The output of differential amplifier 90 is supplied to Schmitt triggers 91 and 92. The output from Schmitt trigger 91 is connected to the input of a bidirectional counter 93 of standard design and to an input of a logic circuit 94. The output of Schmitt trigger 92 is connected to an input of bi-directional counter 93 and an input of a logic circuit 95. Logic circuits 94 and 95 are shown in greater detail in FIG. 3. The output of bi-directional counter 93 is connected to the input of a digital-to-analog converter 96 of standard design, whose output is connected back to a second input of differential amplifier 90.

The output of low-pass filter 55 is also connected to the resistance portion of a potentiometer 88, the other side thereof being connected to ground. The wiper arm of potentiometer 88 is connected to an input of an analog-to-digital converter with a serial output 97 of standard design. Also supplied to analog-to-digital converter 97 is the "command to digitize" output signal from counting circuit 87. The output from analog-to-digital converter 97 is supplied to a binary counter 98 of standard design. When the accumulated count of binary counter 98 reaches a predetermined number, a flip-flop 187 is set so as to apply a "1" to the inhibit portion of the pulse sample and gate circuit 80 and reset the binary counter 98. The flip-flop 187 is then reset by the control signal G from the circuit 80.

The output from direction sensor 83 is supplied to inputs of logic circuits 94 and 95 and inputs of translators 86 and 108. The "down" output from logic circuit 95 and the "up" output from logic circuit 94 are connected to the inhibit portion of pulse sample and gate circuit 80. The "up" output from logic circuit 95 and the "down" output from logic circuit 94 are connected to the add portion of pulse sample and gate circuit 80.

Photocells A, B and C of sensing means 76 supply outputs to trigger and logic circuit 79. Trigger and logic circuit 79 supplies inputs to pulse sample and gate circuit 80, delay logic circuit 81, binary counter 113, and direction sensor 83. The output from binary counter 113 is supplied to an input of calibration logic circuit 76. Delay logic circuit 81 supplies an input to corrector 82. The output from corrector 82 is supplied to the input of a flip-flop 84 and one input of an inhibit gate 115, whose output is supplied to recorder drive 49 outside of depth correction computer 20. The control input to inhibit gate 115 is supplied from an output of pulse sample and gate circuit 80. The output from flip-flop 84 is connected to the input of a flip-flop 85, whose output is connected to a translator 86 of suitable design, as for example, the Slosyn Translator manufactured by Superior Electric Company. Translator 86 comprises a series of switching circuits for translating the serial pulses from depth correction computer 20 to a parallel form suitable for driving stepmotor 109. The output of flip-flop 85 is also connected to counting circuit 87 of standard design, comprising a series of flip-flops. Counting circuit 87 provides a "command to digitize" output signal every one foot of cable travel. Trigger and logic circuit 79, delay logic circuit 81, corrector 82, calibration logic 76, pulse sample and gate circuit 80, and direction sensor 83 are shown in greater detail in FIG. 3.

Calibration logic circuit 76 supplies outputs to both the inhibit portion and add portions of pulse sample and gate circuit 80. Pulse sample and gate circuit 80 provides an output to delay logic circuit 81, a sample output to calibration logic circuit 76, and reset outputs to binary counter 113, binary counter 98 (designated G), and bi-directional counter 93 (designated F). The output from the inhibit portion of pulse sample and gate circuit 80 is supplied to the inhibit function of corrector 82 and the supplied from the add portion of pulse sample and gate circuit 80 is supplied to the add function of corrector 82. Also supplied to the add portion of corrector 82 is the output from the zero speed portion of pulse sample and gate circuit 80.

The output from translator 86 is supplied to the input of a stepmotor 105. The mechanical output from stepmotor 105 is connected through mechanical counter 106, which counts the revolution of the output shaft from stepmotor 105, to gear 107. The mechanical output from gear 107, shown as shaft 111, rotates the wiper arm of potentiometer 89. Gear 107 adapts the rotation of the output shaft from stepmotor 105 to the rotation of the wiper arm of potentiometer 89.

The output from corrector 82 is connected to a translator 108 within recorder drive 49 via the inhibit gate 115. The electrical output from translator 108 is supplied to the input of stepmotor 109, whose mechanical output is connected through gear 110 to recorder 14 of FIG. 1. The translator 108 which drives stepmotor 109 within recorder drive 49 is similar in construction to translator 86 which drives stepmotor 105 within depth correction computer 20. Stepmotor 109 of recorder drive 49 must provide more torque to recorder 14 than stepmotor 105 must supply to the wiper arm of potentiometer 89, and thus stepmotor 109 is larger than stepmotor 105.

Now concerning the operation of the apparatus shown in FIG. 2, the output pulses from photocells A, B and C of sensing device 76 are supplied to trigger and logic circuit 79, which squares off the pulses from sensing device 76 by suitable means, as for example, a voltage-limiting circuit or Schmitt trigger, and sends these pulses to pulse sample and gate circuit 80 and delay logic circuit 81 at intervals of one-quarter inch of cable travel. Trigger and logic circuit 79 also supplies pulses to direction sensor 83, which determines the direction of travel of cable 12.

The purpose of corrector 82 is to apply a correction to the pulses from trigger and logic circuit 79, which pulses represent increments of the measured length $L_m$ of cable 12. Corrector 82 will either inhibit a pulse or add a pulse to the train of one-quarter inch interval pulses originating from trigger and logic circuit 79. Thus, looking at Equation 6, the output from trigger and logic circuit 79 is a differential $L_m$ portion of Equation 6 and the function applied to corrector 82 represents a differential version of the remainder of Equation 6. Each one-quarter inch interval pulse from trigger and logic circuit 79, which is supplied to pulse sample and gate circuit 80, originates a series of sample signals within pulse sample and gate circuit 80 (which will be discussed in greater detail later).

Delay logic circuit 81 delays the pulse from trigger and logic circuit 79 for a sufficient time as to allow the correction to be made. If a pulse is to be added to corrector 82, the pulse from trigger and logic circuit 79 must be delayed beyond the time that a pulse is added to corrector 82.

In addition, pulse sample and gate circuit 80 determines the speed of movement of cable 12 past rotating wheel 18 and switches between two delay circuits within delay logic circuit 81 depending on the speed at which cable 12 is moving, since this speed determines the rate of one-quarter inch interval pulses. Thus, it can be seen that trigger and logic circuit 79 supplies a pulse at every one-quarter inch interval of cable travel past rotating wheel 18, which pulse is delayed by delay logic circuit 81 for the amount of time required to sample and correct the various correction functions, which correction is supplied to corrector 82. This delay is determined by the maximum stepping rate of the stepmotor 109 in the recorder drive 49.

Corrector 82 supplies the corrected length $L_c$ pulses to recorder 49 and flip-flop 84, each pulse still representing one-quarter inch of cable travel. These one-quarter inch interval pulses from corrector 82 are applied to recorder drive 49 through inhibit gate 115 to drive recorder 14. Thus, each pulse received from corrector 82 is caused to drive stepmotor 109, which drives chart 50 (FIG. 1) of recorder 14 by the required amount, and therefore recorder 14 comprises a mechanical storage for the corrected length $L_c$ pulse output from corrector 82.

Now, taking an example of this operation, if in a given interval of time, the cable 12 opposite rotating wheel 18 at the surface of the earth has moved a total distance of 10 inches, there will be a total of 40 pulses supplied from trigger and logic circuit 79 through delay logic circuit 81 to corrector 82. But, if in actuality, the tool 10 within the borehole has only moved 9 inches, corrector 82 will inhibit 4 pulses from trigger and logic circuit 79 within this interval of time. Thus the total output within this interval of time will be a total of 36 pulses, which 36 pulses after being transferred to a mechanical rotation by recorder drive 49, will be stored in recorder 14 in the form of the position of chart 50 of recorder 14 (see FIG. 1) as a total of 9 inches of tool travel. If the actual change in length had been 11 inches on the other hand, corrector 82 would have added 4 pulses and thus recorder 14 would indicate an 11 inch change.

Now concerning the input to be supplied to corrector 82, the purpose of depth correction computer 20 is to solve Equation 6 and supply the result to recorder drive 49. The calibration correction function is supplied from calibration correction means 24 to calibration logic circuit 76. Looking at Equation 6 and FIG. 2, the calibration correction $L_{cal}$ from calibration correction means 24, drill pipe correction $L_{dp}$ from drill pipe correction means 26, and temperature correction $L_t$ from temperature correction means 32, are all supplied directly to adding-network 77 within computer 20, which acts to isolate the inputs while, at the same time, adding the inputs to provide one output to differential amplifier 90. The downhole tension depth error function $u_d(f_h)$ and $½EL\Delta T_d(f_L)$ terms of Equation 6 are supplied from high-pass filter 54 to adding-network 77 to be added to the other inputs thereto. The uphole tension bridge circuit 23 supplied the $\Delta T_u$ term which low-pass filter 55 reduces to zero at high frequencies.

However, there still remains the input of the stretch coefficient E term and the length L term of Equation 6. The length L term is obtained from the corrector 82 output of depth correction computer 20 and is supplied by the output shaft 111 from gear 107 to the wiper arm of potentiometer 89. The one-quarter inch interval pulses from corrector 82 become one-half inch interval pulses on the output of flip-flop 84 and one inch interval pulses on the output of flip-flop 85. These one inch interval serial pulses are translated by translator 86 into parallel form to drive stepmotor 105. The direction of cable travel is supplied to translator 86 from direction sensor 83. The mechanical rotational output from stepmotor 105 rotates the wiper arm of potentiometer 89 by shaft 111. Thus, the position of the wiper arm of potentiometer 89 on the resistance portion of potentiometer 89 is indicative of the corrected length $L_c$ of the tool in the borehole. When the wiper arm of potentiometer 89 is at the ground point of the resistance portion of potentiometer 89, it is seen that the voltage input to adding-network 77 from filter 55 is zero, thus indicating zero cable length. By the same token, when the wiper arm is at the top of the resistance portion of potentiometer 89, there is a maximum voltage applied to adding-network 77 and thus the cable length is at a maximum.

Now referring to the stretch coefficient E input to depth correction computer 20, since the stretch coefficient E varies for different cables but is the same for any given cable, the value of the stretch coefficient E can be inserted into depth correction computer 20 before a logging run and remain at that value. To accomplish this, the stretch coefficient input means 25 is mechanically coupled to the wiper arm of potentiometer 78 and the wiper arm of potentiometer 88. The position of the wiper arm of potentiometer 88 is indicative of the stretch coefficient E and the position of the wiper arm of potentiometer 78 gives the value of $E/2$. Thus, the signal present on the wiper arm of potentiometer 78 is proportional to $½E\Delta T_u$, the signal present on the wiper arm of potentiometer 89 is proportional to $½EL\Delta T_u$, and the signal present on the wiper arm of potentiometer 88 is proportional to $E\Delta T_u$. The output from adding-network 77 is thus proportional to the relationship $$½EL(\Delta T_u+T_d)(f_L)+u(f_h)+L_t-L_{dp}$$

Differential amplifier 90 senses the difference in voltage between the output voltage from adding-network 77 and the output voltage from digital-to-analog converter 96 and supplies an output voltage proportional to the difference between these applied input voltages. If the applied input voltage from adding-network 77 is greater than the applied input voltage from digital-to-analog converter 96 by a prescribed amount, Schmitt trigger 91 is energized and provides an output signal to the plus input terminal of bi-directional counter 93. When the correction is made by corrector 82, a pulse is sent to bi-directional counter 93 from pulse sample and gate circuit 80 on output F to cause bi-directional counter 93 to count forward. Digital-to-analog converter 96 converts the count present in bi-directional counter 93 to an analog signal which is supplied back to differential amplifier 90, thus causing the output of differential amplifier 90 to return to 0 volts, if only one count has been accumulated. This resets Schmitt trigger 91, if differential amplifier 90 is returned to zero, to enable Schmitt trigger 91 to be ready for another input.

By the same token, if the input to differential amplifier 90 from adding-network 77 should decrease by a prescribed amount, differential amplifier 90 will have a negative output, thus causing Schmitt trigger 92 to switch on. Schmitt trigger 92 then supplies an output signal to the negative terminal of bi-directional counter 93, causing bi-directional counter 93 to count in a reverse direction via the output F from corrector 80. The total count within bi-directional counter 93 would thus be less, causing the analog output from digital-to-analog converter 96 which is supplied back to differential amplifier 90 to be less. Thus, the output from differential amplifier 90 will return to zero volts, if only one count is necessary, resetting Schmitt trigger 92 for another output from differential amplifier 90. Thus, it can be seen that differential amplifier 90 supplies an output voltage indicative of the magnitude and polarity of the difference between the output voltage from adding-network 77, and the accumulated count in bi-directional counter 93. Schmitt triggers 91 and 92 monitor the magnitude and polarity of this difference signal and operates to either add or subtract a $L_m$ pulse in corrector 82 if the magnitude of this difference signal exceeds the threshold level of either trigger 91 or 92. The threshold voltage of triggers 91 and 92 are set equal to one-quarter inch of cable stretch.

If now a very large voltage is supplied from adding-network 77 to differential amplifier 90, Schmitt triggers 91 and 92 can only provide one output pulse at a time since their threshold voltages are set for only one-quarter inch of cable travel and bi-directional counter 93 must be reset by the output F from pulse sample and gate circuit 80 before another count can be registered. The output voltage from Schmitt triggers 91 or 92 applied to di-directional counter 93, digital-to-analog converter 96, and subsequently back to differential amplifier 90 in the form of an analog signal, will still leave a large voltage output from differential amplifier 90 since only that portion of voltage due to one-quarter inch of cable stretch has been taken away from the output of differential amplifier 90. Thus, one of Schmitt triggers 91 or 92 will remain energized, providing another count to bi-directional counter 93, thus reducing the difference between the inputs to differential amplifier 90 still more. This process continues until the two inputs to differential amplifier 90 are within a prescribed voltage difference of one another.

Since the output pulses from Schmitt triggers 91 and 92 each represent one-quarter inch of cable stretch, these output pulses from Schmitt triggers 91 and 92 are utilized in the correction of the measured length $L_m$ pulses from delay logic circuit 81. The output pulses from Schmitt triggers 91 and 92 are supplied to logic blocks 94 and 95 respectively, which logic blocks determine whether a pulse should be added to or inhibited from the measured length $L_m$ pulses depending on whether the logging tool 10 is moving up or down the borehole. If the tool 10 is moving down the borehole, each $L_m$ pulse represents an increase in depth of the tool within the borehole. Therefore if the cable 12 stretches, a pulse must be added to the length measurement $L_m$, and if the cable decreases in stretch, a pulse must be inhibited from the output of delay logic circuit 81. On the other hand if the tool is moving up the borehole, each pulse represents a decrease in depth of tool 10 within the borehole. Therefore in this case, if the cable 12 stretches, a pulse must be inhibited from reaching recorder drive 49 and on the other hand if the cable 12 decreases in stretch, an additional pulse must be added to recorder drive 49.

Logic circuits 94 and 95 accomplish this function. Direction sensor 83 supplies a signal to logic circuits 94 and 95 indicating the direction of travel of cable 12. This input signal from direction sensor 83 switches between the up and down outputs of logic circuits 94 and 95. That is, when the cable 12 is moving down, the down outputs of logic circuits 94 and 95 are enabled to be energized and when the cable 12 is moving up, the up outputs are enabled to be energized. The down output from logic circuit 95 and the up output from logic circuit 94 are supplied to the inhibit function of corrector 82 by way of the inhibit portion of pulse sample and gate circuit 80. The up output from logic circuit 95 and the down output from logic circuit 94 are supplied to the add function of corrector 82 by way of the add portion of pulse sample and gate circuit 80.

Thus it can be seen that when cable 12 is moving in a downward direction, a cable stretch pulse from Schmitt trigger 91 will be supplied to the add function of corrector 82 and a reduction in cable stretch from Schmitt trigger 92 will be applied to the inhibit function of corrector 82. On the other hand when the cable is moving up the borehole, a cable stretch output from Schmitt trigger 91 will be applied to the inhibit function of corrector 82 and a reduction in stretch output from Schmitt trigger 92 will be applied to the add function of corrector 82. After the add or inhibit function is applied to corrector 82, pulse sample and gate circuit 80 supplies a pulse to bi-directional counter 93 (output F) to cause bi-directional counter 93 to count forward or backward, depending on whether the + or − input of counter 93 is energized.

Now concerning the calibration correction input to corrector 82 of depth correction computer 20, this calibration correction concerns the calibration of length measuring device 19 and rotating wheel 18 attached thereto. Even though the maximum error that could be present on each of the one-quarter inch pulses from trigger and logic circuit 79 is extremely small, the aggregation of an extremely small error over an extremely long distance, such as the distance to the bottom of the borehole, may be substantial. Thus the rotating wheel 18 and length measuring device 19 are calibrated before being utilized in a logging run. The resulting calibration correction is set into the calibration correction means 24. Binary counter 113 counts the number of one-quarter inch pulses from trigger and logic circuit 79. Calibration correction means 24 provides the information to calibration logic circuit 76 concerning the count that binary counter 113 should reach before a correction is applied to corrector 82. Calibration logic circuit 76 comprises a series of AND gates in a conventional manner, or one AND gate connected to various ones of the stages of binary counter 113, which stages depending on the desired count of binary counter 113. Calibration correction means 24 also supplies the information as to whether a pulse should be inhibited or added. The outputs from calibration logic circuit 76 are supplied to the inhibit and add function of corrector 82 through the inhibit and add portions of pulse sample and gate circuit 80. After a calibration correction is supplied to corrector 82, binary counter 113 is reset back to zero by pulse sample and gate circuit 80. Thus, it can be seen that at given intervals of length, a calibration correction pulse is either added to or inhibited from recorder drive 49.

Now concerning the $$-E \int_0^L \Delta T_u dL(f_L)$$

term of Equation 6, the circuitry for applying this correction to corrector 82 comprises analog-to-digital converter 97, binary counter 98 to pulse sample and gate circuit 80, and counting circuit 87 to analog-to-digital converter 97. The input signal from the wiper arm of potentiometer 88 which is applied to analog-to-digital converter 97, is equal to $E\Delta T_u$. Analog-to-digital converter 97 converts this applied analog voltage into a series of digital pulses which are applied to binary counter 98 at given intervals of length. The on-time of analog-to-digital converter 97 is proportional to the applied analog voltage, and the frequency is fixed. The given interval of length is obtained from the circuitry comprising flip-flops 84 and 85 and counting circuit 87. The one-inch interval output pulses from flip-flop 85 are applied to counting circuit 87, which counts to a desired length, as for example one foot, and applies a "command to digitize" signal to analog-to-digital converter 97, which causes analog-to-digital converter 97 to provide the series of digital pulses. The total number of digital pulses is proportional to the applied analog voltage, during each "command to digitize."

Binary counter 98 counts these pulses from analog-to-digital converter 97 and provides an output pulse to the input of a flip-flop 187, the output of which is supplied to the inhibit portion of pulse sample and gate circuit 80. This output pulse from binary counter 98 is generated after a predetermined number of pulses has been counted, this predetermined number of pulses being equal to one-quarter inch of cable stretch. The output of flip-flop 187 is also supplied back to the reset input of binary counter 98, so that binary counter 98 will be reset each time a pulse is generated from binary counter 98. Pulse sample and gate circuit 80 supplies a signal back to the reset input of flip-flop 187 to reset flip-flop 187 for the next output pulse from binary counter 98. This reset signal is designated G. It can be seen that by this means, binary counter 98 only stores one-quarter inch of cable travel therein, and the remainder of the $$-E \int_0^L \Delta T_u dL(f_L)$$

term of Equation 6 is stored in recorder 14 in the form of the position of chart 50. Therefore, if power should be lost at any time a maximum of one-quarter inch of cable stretch would be lost.

Now, concerning the time sequence of the various depth correction operations, it can be seen that there are three sets of correction inputs which may be applied to corrector 82. These correction inputs are the calibration correction from calibration logic circuit 76, the $$-E \int_0^L \Delta T_u dL(f_L)$$

term of Equation 6 from binary counter 98, and the output from logic circuits 94 and 95. If there should be a correction on two or three of these correction inputs at the same time, it might seem that all but one correction input would be lost since only one input can be applied to corrector 82 at any given time. To solve this problem each of the different correction functions are sampled in a given sequence. The output from trigger and logic circuit 79 which is applied to pulse sample and gate circuit 80 originates the sample outputs from pulse sample and gate circuit 80. Pulse sample and gate circuit 80 first samples calibration logic circuit 76 to determine if there is a correction output from calibration logic circuit 76. If there is such a correction output, it is supplied to corrector 82 and the sample process resets. If there is no correction output present from calibration logic circuit 76, pulse sample and gate circuit 80 samples logic circuits 94 and 95 next. (One but not both logic circuits 94 and 95 can have a correction output. If there is a correction output from binary counter 98, it is then supplied through flip-flop 187 to corrector 82 and the sample process resets. If there is no correction output from logic circuits 94 and 95, pulse sample and gate circuit 80 samples the output from flip-flop 98a. If there is no correction output from binary counter 98, the next one-quarter inch pulse from trigger and logic circuit 79 initiates the sampling process all over again.

The delay logic circuit 81 has delayed the pulse from trigger and logic circuit 79 a sufficient time such that if the inhibit function of corrector 82 is to be energized, the output pulse from delay logic circuit 81 will arrive at corrector 82 after the inhibit function is energized. If there is a pulse to be applied to the add function of corrector 82, it is added before the delayed $L_m$ pulse passes through corrector 82. If any one of the three correction functions has an output pulse to provide to corrector 82, the remaining correction functions are not sampled in the present sampling operation even if one or both of the remaining correction functions has a correction output to provide to corrector 82. The sample operation would be reset and these correction functions would be sampled during subsequent sample operation originated by the one-quarter inch pulses from trigger and logic circuit 79.

When the reeling mechanism at the surface of the earth stops reeling cable, rotating wheel 18 will stop rotating, thus stopping the pulses from trigger and logic circuit 79. If the pulses from trigger and logic circuit 79 are stopped, there could be no pulses out of corrector 82 from the above-described correction operations of depth correction computer 20 since the $L_m$ pulses originate the sampling process. However, when the reeling mechanism at the surface of the earth stops, there may still be movement of the tool 10 caused by the stretch of cable 12. To provide the necessary depth correction when the cable reeling mechanism is stopped, pulse sample and gate circuit 80 energizes a zero speed detector function which samples logic circuits 94 and 95 at given intervals of time. If the reeling mechanism stops when the cable is being reeled out, the cable will only tend to stretch, and if stopped when the cable is being reeled in, the cable will only tend to decrease in stretch, due to the inertia of the cable and tool. In either case, a pulse would be added by corrector 82. Thus, the zero speed function of pulse sample and gate circuit 80 is only applied to the add functions of corrector 82. By this means the depth measurement can be continuously corrected even when the cable reeling device has stopped.

Referring now to the recorder drive 49, the translator 108, stepmotor 109 and gear 110 operate in the same manner as translator 86, stepmotor 105 and gear 107 with direction sensor 83 supplying the direction of cable travel to translator 108. However, since recorder 14 requires more torque output than does the wiper arm of potentiometer 89, stepmotor 109 is larger than stepmotor 105 and cannot be driven as fast. Since there are times when investigating boreholes that it is desirable to move the tool at a great rate of speed through the borehole, stepmotor 109 is adapted to be cut off when a certain rate of speed is attained. To accomplish this, pulse sample and gate circuit 80 supplies a signal to the control input of inhibit gate 115 to inhibit the output pulses from corrector 82 from reaching recorder drive 49 upon this high rate of speed being attained. Below this maximum speed, there is no signal applied to inhibit gate 115 thus allowing the output pulses from corrector 82 to pass to recorder drive 49. To set recorder 14 to the desired depth after such an increased speed run, the mechanical counter 106 on the output of stepmotor 105 is utilized, since stepmotor 105 is adapted to be rotated at a much greater rate of speed than stepmotor 109.

Thus, it can be seen that the cable length characteristics are supplied to a means for deriving a correction signal for inhibiting or adding pulses from trigger and logic circuit 79. The cable length L portion of Equation 6 has been shown in FIG. 2 to be derived from the corrected cable length $L_c$ by way of shaft 111 and counting circuit 87. However, the measured cable length $L_m$ could also be used for this purpose without departing from the scope of the invention, since any resulting difference would be negligible.

Looking at FIG. 5, the dotted line represents the cable length stretch correction from the tension functions applied to the $L_m$ pulses from trigger and logic circuit 79. Length measuring device 19 will give an accurate depth indication until there is a speed change, reversal of direction, or erratic tool motion. It is seen that the stretch correction applied to the $L_m$ pulses occurs only at speed changes, reversal of direction, or erratic tool motion. Thus, there is a correction A' corresponding to speed decrease A, a correction B' corresponding to reversal of direction B, a correction C' corresponding to speed increase C, and a correction D' corresponding to erratic tool motion D. The correction D' will follow substantially close to the actual tool motion D, as shown in FIG. 5. The calibration, temperature, and drill pipe corrections are not shown in FIG. 5 but would cause a gradual change in the dotted line stretch correction of FIG. 5.

Looking now at FIG. 3 there is shown a more detailed representation of a portion of the apparatus of FIG. 1 and FIG. 2. Photocell A of sensing device 76 is connected to the input of a trigger 132, photocell B is connected to the input of a trigger 131 and photocell C is connected to the input of a trigger 130. Triggers 130, 131 and 132 square off the pulses from photocells A, B and C, as for example, by a voltage-limiting circuit or Schmitt trigger. The outputs of triggers 130 and 131 are connected to separate inputs of direction sensor 83. The output from trigger 131 is connected to the input of a one-shot multivibrator 116 which produces a pulse having a width of 5 microseconds. The output from one-shot 116 is supplied to one input of an AND gate 117, whose output is connected to the $I_1$ input of a flip-flop 118. The other input to AND gate 117 is supplied from trigger 130. The output from one-shot 116 is also supplied to one input of an AND gate 119, whose output is supplied to the $I_0$ input of flip-flop 118. The other input to AND gate 119 is supplied from the output of inverter 120, whose input is supplied from the output of trigger 130. The 1 output from flip-flop 118, designated D, indicates a downward direction of cable travel, and the 0 output from flip-flop 118, designated U, indicates an upward direction of cable travel.

The output from trigger 131 is supplied to the $I_1$ input of flip-flop 133, and the output from trigger 132 is supplied to the $I_0$ input of flip-flop 133. The 1 and 0 outputs from flip-flop 133 are capacitively coupled to the input of a one-shot multivibrator 134, which has a pulse width of 600 microseconds. The output of trigger 130 is also supplied to a pulse rate to voltage converter 135, which could be, for example, a filter which provides an output voltage proportional to pulse rate. The output from pulse rate to voltage converter 135 is supplied to the input of a Schmitt trigger 121, whose threshold voltage is adjusted such that an output will occur when the voltage from pulse rate to voltage converter 135 exceeds a certain level. The output from Schmitt trigger 121, designated $\overline{S}$, is applied to certain circuits in FIG. 3, which will be discussed later. The output from Schmitt trigger 121 is also applied to an inverter 122, whose output, designated S, is applied to certain circuits in FIG. 3, also to be discussed later. The output from pulse rate to voltage converter 135 is also supplied to the input of a differential amplifier 123, whose output is supplied to a Schmitt trigger 124. Supplied to the other input of differential amplifier 123 is a DC voltage equal to the voltage magnitude which will trigger Schmitt trigger 124, i.e., Schmitt trigger's 124 threshold voltage. The purpose of differential amplifier 123 is to adapt Schmitt trigger 124 to provide an output upon the voltage from pulse rate to voltage converter 135 becoming zero. The output from Schmitt trigger 124 is supplied to the input of an AND gate 137. The other input to AND gate 137 is supplied from a pulse generator 138 which supplies pulses at a frequency of 120 c.p.s. The output of AND gate 137 is designated P and is supplied to a given circuit within the FIG. 3 apparatus, to be discussed later.

The output from one-shot multivibrator 134 is supplied to one input of an AND gate 139. The other input to AND gate 139 is supplied from the $\bar{S}$ output of Schmitt trigger 121. The output from AND gate 139 is supplied to a delay circuit 140, which provides a delay of .5 millisecond. The output from one-shot multivibrator 134 is also supplied to one input of an AND gate 141. The other input to AND gate 141 is supplied from the S output from inverter 122. The output from AND gate 141 is supplied to a delay circuit 142, which has a delay of 3 milliseconds. The outputs from delay circuits 140 and 142 are supplied to an OR gate 143, whose output is supplied to a one-shot multivibrator 144, which has a pulse width of 200 milliseconds. The output from one-shot multivibrator 144 is supplied to one input of an OR gate 145. The output from OR gate 145 is supplied to the input of an inhibit circuit 146 and one input of an AND gate 147. This signal from OR gate 145 will pass through inhabit gate 146 unless there is a signal present on the control terminal thereof. The output from inhibit circuit 146 is supplied to one input of an OR gate 148. The output from OR gate 148 represents the output from corrector 82 of FIG. 2. The apparatus on the output of OR gate 148 is the same as in the FIG. 2 apparatus, which has been explained in connection with FIG. 2.

The output from one-shot multivibrator 134 is also supplied to the input of binary counter 113. These pulses from one-shot multivibrator 134 are those that are counted by binary counter 113. The output from binary counter 113 is supplied to a logic circuit 149, which comprises a series of AND gates for enabling an output after a specified count by binary counter 113. The output from logic circuit 149 is conected to one input of an AND gate 150 and one input of and AND gate 151. The other inputs to AND gates 150 and 151 are supplied from calibration correction means 24, which also supplies an output to logic circuit 149 for controlling the logic function, i.e., for selecting the count from binary counter 113 at which logic circuit 149 will provide an output. The outputs from AND gates 150 and 151 are supplied to OR gate 152, whose output is supplied to the input of an inverter 153. The output from AND gate 150 is also supplied to one input of an AND gate 154. The output from AND gate 151 is also supplied to one input of an AND gate 155.

The output from one-shot multivibrator 134 is also supplied to the $I_1$ input of a flip-flop 156. The 1 output from flip-flop 156 is connected to inputs of AND gates 154, 155 and 157. The other input to AND gate 157 is supplied from the output of inverter 153. The output of AND gate 157 is connected to the $I_1$ input of a flip-flop 158. Another output from AND gate 157 is supplied to the reset input of flip-flop 156. The output from AND gate 154 is supplied to one input of an OR gate 159, whose output is supplied to the input of a one-shot multivibrator 160, having a pulse width of 200 microseconds. The output from one-shot 160 is supplied to the inputs of OR gate 145, AND gate 161, OR gate 186, and AND gate 176. The output from AND gate 154 is also supplied to one input of an AND gate 161, whose output is supplied to one input of an OR gate 162. The output from OR gate 162 is supplied to the reset input of counter 113. This reset input sets binary counter 113 back to a zero count. The output from AND gate 155 is supplied to an input of an OR gate 163 and to one input of an AND gate 164. The output of AND gate 164 is supplied to an input of OR gate 162.

The 1 output from flip-flop 158 is supplied to inputs of AND gates 165, 166, and 167. The circuitry comprising adding-network 77, differential amplifier 90, Schmitt triggers 91 and 92, bi-directional counter 93, and digital-to-analog converter 96 has been explained in detail, in connection with FIG. 2 and will not be discussed in connection with FIG. 3. The output from Schmitt trigger 91 is supplied to the inputs of AND gates 168 and 169. The output from Schmitt trigger 92 is supplied to the inputs of AND gates 170 and 171. Also supplied to an input of AND gates 168 and 171 is the output D from the 1 output of flip-flop 118 designating a downward direction. The 0 output of flip-flop 118 supplies the output U to inputs of AND gates 169 and 170 designating an upward direction of travel. The outputs of AND gates 168 and 170 are supplied to inputs of an OR gate 172. The outputs of AND gates 169 and 171 are supplied to inputs of an OR gate 173.

The output of OR gate 172 is supplied to inputs of AND gate 165, AND gate 174, and on OR gate 175. The output from OR gate 173 is supplied to the inputs of OR gate 175 and AND gate 166. The other input to AND gate 174 is supplied from the output P of AND gate 137. The output from AND gate 165 is supplied to an input of OR gate 159 and an input of an AND gate 176. The output from AND gate 176 is supplied to an input of OR gate 181. The output from AND gate 174 is supplied to the point Z, which comprises the other input to OR gate 148. The output from AND gate 174 is also supplied to an input of an OR gate 177, whose output is supplied to the reset input of bi-directional counter 93. The output from OR gate 175 is supplied to the input of an inverter 178, whose output is supplied to the other input of AND gate 167. The output of AND gate 167 is supplied to the $I_1$ input of a flip-flop 179, and to the reset input of flip-flop 158. The output of AND gate 166 is supplied to the inputs of an AND gate 180 and OR gate 163. The output from AND gate 180 is supplied to an input of an OR gate 181, whose output is supplied to an input of OR gate 177.

The 1 output from flip-flop 179 is supplied to the inputs of an AND gate 182 and an AND 183. The output of AND gate 183 is supplied to the reset input of flip-flop 179. The output of AND gate 182 is supplied to the inputs of an AND gate 184 and OR gate 163. The output from OR gate 163 is supplied to the input of a flip-flop 185, whose 1 output is supplied to the control input of inhibit gate 146 and to an input of AND gate 147. The output of AND gate 147 is supplied to the inputs of an OR gate 186, AND gate 184, AND gate 180, AND gate 164, and the input of a delay circuit 125, having a delay of 250 microseconds. The output from delay circuit 125 is supplied to the reset input of flip-flop 185. The output from AND gate 184 is supplied to the reset input of a flip-flop 187. The 1 output from flip-flop 187 is supplied to the inputs of AND gate 182, an inverter 188, and the reset input of binary counter 98. The output from inverter 188 is supplied to an input of AND gate 183 and the output from binary counter 98 is supplied to the $I_1$ input of flip-flop 187. The output N from OR gate 186 is supplied to the reset inputs of flip-flops 156, 158 and 179. The circuitry comprising low-pass filter 55, potentiometer 88, analog-to-digital converter 97, and binary counter 98 has been explained in connection with FIG. 2 and will not be explained in connection with FIG. 3.

Concerning the gate circuit designations, the energization of the $I_1$ input of a flip-flop will produce an output voltage on the 1 output and take away the output on the 0 output terminal. When the $I_0$ input is energized, a voltage output will appear on the 0 output and will disappear from the 1 output terminal. If there is no 0 output terminal, the $I_0$ input is designated R for resets. For the inhibit gates, a voltage on the control input terminal, designated by a semi-circle, will inhibit the other input from passing through to the output thereof.

Now concerning the operation of the apparatus shown in FIG. 3, the outputs from photocells A, B and C of sensing device 76 are squared by triggers 130, 131 and 132. Referring to FIGS. 7a, 7b and 7c, there are shown the pulse outputs from triggers 130, 131 and 132. The output from trigger 132 is shown in FIG. 7a, the output from trigger 131 is shown in FIG. 7b, and the output from trigger 130 is shown in FIG. 7c. The pulses on each track are one-half inch apart as determined by the positions of the slits on rotating drum 70 (FIG. 2). The positions of the slits on tracks A and B of rotating drum 70 (FIG. 2) are set such that the pulses from track B are intermediate of the pulses from track A. Therefore, there will be one-quarter inch between the leading edge of a pulse from track A and the leading edge of a pulse from track B, irregardless of the direction of rotation of rotating drum 70. Referring back to FIG. 3, the outputs from triggers 131 and 132 are supplied to the $I_1$ and $I_0$ inputs of flip-flop 133 which causes outputs from the 1 and 0 outputs of flip-flop 133 to one-shot 134. Thus, one-shot 134 will receive an input pulse every one-quarter inch of cable travel.

The pulses from track C overlap the pulses generated from track B in the manner shown in FIGS. 7b and 7c. The leading edge of the pulse from track B is sampled to determine if it is in coincidence with the pulse from track C. FIG. 7d represents the leading edge sampling of the pulse from track B, the solid line representation in FIG. 7d representing the rotation of rotating drum 70 in an upward direction and the dotted line representation representing the downward direction. It can be seen that when the direction is to the right in FIG. 7d represented by time $t$, the pulse from track C will not be in coincidence with the sampling pulse (FIG. 7d) originated by the pulse from track B. On the other hand, when the rotation is to the left in FIG. 7d represented by time $t$, the sampling pulse originated by the track B pulse will be in coincidence with the pulse from track C. Thus, direction sensor 83 determines the direction of travel of cable 12 within the borehole by the logic function $B\overline{C}$ representing travel in an upward direction and BC represents the travel in the downward direction.

Looking at FIG. 3, the sampling pulse shown in FIG. 7d is originated by one-shot 116, whose pulse width is less than one-half the pulse width of the pulse from triggers 130–132 so that if the time $t$ is to the right in FIG. 7d, the sampling pulse will have terminated before the track C pulse is initiated. The output of AND gate 117 will be energized if the track C pulse is present while one-shot 116 is energized, thus triggering the $I_1$ input of flip-flop 118, and causing the 1 output of flip-flop 118 to be energized. Thus $B\overline{C}$ would be true and the direction of travel is down. If on the other hand $\overline{BC}$ is true, the output of inverter 120 would be energized, thus energizing AND gate 119, and thus the $I_0$ input flip-flop 118 would be triggered, causing the 0 output, designated U (upward direction) to be energized.

The pulse output from one-shot 134, each pulse representing one-quarter inch of cable travel, is supplied through either delay 140 and 142 to one-shot 144. One-shot 144 generates a pulse which is applied through inhibit gate 146, if open, and then through OR gate 148, inhibit gate 115, if open, to recorder drive 49. These pulses from one-shot 134 to recorder drive 49 represents the measured length pulses $L_m$ which are applied to recorder drive 49.

However, the measured length $L_m$ pulses must be delayed in order to give the sample logic time to operate. Delay circuits 140 and 142 are provided for this purpose. Whether delay 140 or 142 is utilized depends on the rate of travel of cable 12 as indicated by the output pulses from trigger 130. As long as the speed is below a certain level, in this case, 12,000 feet per hour, the output S from inverter 122 will have an output voltage thereon, which is supplied to AND gate 141, thus causing the measured length $L_m$ pulses from one-shot 134 to pass through delay circuit 142. When the speed passes that certain level, an output voltage will be present on the output $\overline{S}$ of Schmitt trigger 121, thus enabling AND gate 139 and allowing the measured length pulses $L_m$ to pass through delay circuit 140. Delay circuit 140 provides less delay than delay circuit 142 because of the greater cable speed which causes the pulse rate to increase.

To determine the pulse rate, and thus cable speed, pulse rate to voltage converter 135 senses the pulse rate from trigger 130 and provides an output voltage proportional to that pulse rate. When the pulse rate reaches the given level (12,000 ft. per hour), Schmitt trigger 121, whose threshold voltage is set for that given level, provides the $\overline{S}$ output. At cable speeds below the given level Schmitt trigger 121 will not be triggered and inverter 122 will provide the S output.

Now concerning the operation of the circuitry for providing the correction to the measured length $L_m$ pulses, the one-quarter inch output pulses from one-shot 134 are counted by counter 113. The calibration correction input means 24 sets the logic of logic circuit 149 so that logic circuit 149 will provide an output after a certain number of counts by counter 113, which certain number of counts has been determined according to the calibration error of wheel 18 and length measuring device 19. For example, if it is determined that there is a one-quarter inch error for every one thousand counts of the output pulses from one-shot 134, logic circuit 149 will provide an output pulse after one thousand counts. AND gates 150 and 151 determine whether a pulse should be added or subtracted. Thus, if a pulse is to be added, AND gate 150 will be energized after one thousand counts.

The pulse output from one-shot 134 also triggers flip-flop 156 which enables AND gates 154, 155 and 157 to initiate the sample operation. If there is a calibration correction pulse from AND gate 150, it is applied through AND gate 154 and OR gate 159 to one-shot 160. One-shot 160 provides a pulse through OR gate 145, inhibit gate 146, OR gate 148, and inhibit gate 115, if open, to recorder drive 49. This comprises the add function of corrector 82 of FIG. 2. On the other hand, if AND gate 151 is energized, thus designating an inhibit calibration correction function, the pulse output from logic circuit 149 is supplied through AND gate 151, AND gate 155, and OR gate 163 to flip-flop 185. The output from flip-flop 185 is supplied to the control input of inhibit gate 146, thus closing inhibit gate 146 to any pulses applied from OR gate 145. Thus, it can be seen that the measured length $L_m$ pulse from one-shot 144 will be inhibited from passing through to recorder drive 49 in this case.

If either an add or inhibit function is present from AND gate 150 or 151, flip-flop 156 is reset in readiness for another pulse from one-shot 134, by a reset pulse from OR gate 186. The add pulse from one-shot 160 is supplied directly to OR gate 186 for this purpose and the inhibit pulse from flip-flop 185 is supplied through AND gate 147, to OR gate 186. The other input to AND gate 147 is energized when the measured length $L_m$ pulse is supplied to inhibit gate 146 from OR gate 145. This reset pulse from AND gate 147 to OR gate 186 also resets flip-flop 185 through delay circuit 125. Delay circuit 125 keeps flip-flop 185 from resetting before the $L_m$ pulse from one-shot 144 has terminated.

On the other hand, if there were no output from either AND gate 150 or 151, neither of AND gates 154 or 155 would have been energized to supply the add or inhibit function. Instead, AND gate 157 would have been energized since there would have been no output pulse from OR gate 152, thus causing an output pulse to be applied to the input of AND gate 157 from the output of inverter 153. This then would have energized flip-flop 158 for the purpose of sampling Schmitt triggers 91 and 92, and to reset flip-flop 156.

Now looking at the output function from Schmitt triggers 91 and 92, if there is an output pulse present from Schmitt trigger 91, AND gate 168 or 169 will be energized depending on whether direction sensor 83 has an output on the U or D outputs. Likewise if Schmitt trigger 92 has an output, either AND gate 170 or 171 will be energized depending on the direction of travel of the cable. Since a stretch in cable 12 coupled with a down direction of travel or a decrease in stretch coupled with an up direction of travel calls for a pulse to be added, the outputs from AND gates 168 and 170 are supplied through OR gate 172 and AND gate 165 (which has been enabled by the output from flip-flop 158), and OR gate 159 to one-shot 160. The with a down direction of travel calls for a pulse to be in the same manner as described earlier.

On the other hand since a stretch in cable coupled with an up direction of travel or a decrease in stretch coupled with a down direction of travel calls for a pulse to be inhibited, the outputs from AND gates 169 and 171 are supplied through OR gate 173, AND gate 166 (which has been enabled by the output from flip-flop 158), and OR gate 163 to flip-flop 185. The output pulse from flip-flop 186 causes a pulse to be inhibited in the same manner as described earlier.

If there had been an add or inhibit function output pulse from either OR gate 172 or 173, a reset pulse would be supplied to flip-flops 156 and 158 through OR gate 156 in the same manner as before. Thus, the next pulse from one-shot 134 would initiate the sampling process all over again. If on the other hand, there were no output pulse from either OR gate 172 or 173, OR gate 175 would not be energized and thus inverter 178 would supply an output pulse to AND gate 167 which has been enabled by the output pulse from flip-flop 158. Thus, AND gate 167 will trigger flip-flop 179 to sample binary counter 98. Flip-flop 179 supplies pulses to one input of AND gates 182 and 183 and resets flip-flop 158.

If there is an output pulse present from counter 98, flip-flop 187 is triggered which supplies a pulse through AND gate 182 and OR gate 163 to flip-flop 185, which inhibits a pulse in the manner described earlier. The output from flip-flop 187 also resets counter 98 to the zero position in readiness for another count and causes inverter 188 to provide a zero output to AND gate 183. If there had been an output from counter 98, flip-flop 187 would be reset from AND gate 184 whose inputs are supplied from AND gate 182, which has been energized by the output from flip-flop 187, and the output from AND gate 147 which is present when the inhibit function has taken place. Also flip-flop 179 is reset by the output from OR gate 186 at the same time that flip-flops 156 and 158 are reset, in case there is a correction. If on the other hand, there had been no output from counter 98, there would be no output from flip-flop 187 and thus inverter 188 would supply an output to AND gate 183 whose other input has been supplied from the output of flip-flop 179, to reset flip-flop 179 in readiness for another sampling operation.

Referring to FIG. 7 to better understand the operation of the FIG. 3 apparatus, FIGS. 7a and 7b show the pulses applied to flip-flop 133 from triggers 131 and 132. The output of one-shot 134, shown in FIG. 7e, is represented as pulses on the leading edges of the pulses on tracks A and B of FIGS. 7a and 7b. These pulses from one-shot 134 initiate the sampling operation. If there is a pulse to be added, by way of one-shot 160 or OR gate 145, it will occur almost immediately after the leading edge of the pulse outputs from one-shot 134. This add function pulse is represented in FIG. 7f. Each add function pulse is shown originating at approximately the leading edge of each pulse present on tracks A and B of FIGS. 7a and 7b, any delay being due to the inherent delay of the logic circuits. FIG. 7g represents the output pulses from one-shot 144 which are the delayed measured length $L_m$ pulses. These delayed $L_m$ pulses of FIG. 7g are intermediate of the add function pulses of FIG. 7e so as to not coincide therewith. Thus, it can be seen that the add function pulses and delayed $L_m$ pulses may both pass through to recorder drive 49 without interference from one another.

If on the other hand, there is an inhibit function it is initiated by the pulse outputs from one-shot 134 in the same manner as the add function pulses. In the inhibit function case, a pulse must be applied to inhibit gate 146 until the delayed $L_m$ pulse has passed. This is shown in FIG. 7h where the inhibit function pulse from the output of flip-flop 185 is initiated at the leading edge of each output pulse from one-shot 134 (shown in FIG. 7e) and is present until the delayed $L_m$ pulse from one-shot 144 has terminated. This inhibit function is then turned off by a pulse from AND gate 147 before the initiation of another pulse from one-shot 134.

When the reeling mechanism at the surface of the earth is stopped, there are no pulses generated from triggers 130, 131 and 132 Therefore the sampling operation described above cannot take place. However, as stated earlier, the cable may still change in length. In this case, a pulse will have to be added to recorder drive 49 if there is more than a one-quarter inch change in the length of the cable after the reeling mechanism is stopped.

When the reeling mechanism is stopped, pulse rate to voltage converter 135 will provide a 0 volt output to differential amplifier 123 which causes differential amplifier 123 to provide a 1 output to Schmitt trigger 124, causing Schmitt trigger 124 to enable AND gate 137. Pulse generator 138 is continuously supplying pulses to AND gate 137. Thus, when the reeling mechanism is stopped, AND gate 137 will provide an output P, which represents the pulses from pulse generator 138. This output P from AND gate 137 is supplied to one input of AND gate 174. The other input to AND gate 174 is supplied from OR gate 172, which supplied the add functions from Schmitt triggers 91 and 92. The output from AND gate 174 is supplied to OR gate 148, whose output is supplied to recorder drive 49 through inhibit gate 115, if open. The output from AND gate 174 also resets bi-directional counter 93 through OR gate 177 in case there is more than one correction. Thus, it can be seen that when the cable reeling mechanism stops, AND gate 174 is enabled by the output pulses P from AND gate 137, so that if there is an add correction from OR gate 172, it will be applied to recorder drive 49.

Summarizing the operation of the apparatus shown in FIG. 3, one-shot 134 supplies the measured length $L_m$ pulses at one-quarter inch intervals to one of the selected delay circuits 140 or 142, the particular delay circuit depending on the rate of cable travel output from pulse rate to voltage converter 135. While this $L_m$ pulse is being delayed, flip-flop 156 is energized to allow an add or inhibit function from the calibration correction circuitry to pass through either AND gate 154 or 155. If there is a calibration correction, the correction is made in the manner described above (i.e. one-shot 160 is triggered for an add function and flip-flop 185 is triggered for an inhibit function) and flip-flop 156 is reset through OR gate 186 and binary counter 113 is reset through OR gate 162 from either AND gate 164 or AND gate 161.

If there is no calibration correction for this particular pulse from one-shot 134, flip-flop 158 is triggered and flip-flop 156 is reset by the output from AND gate 157. Flip-flop 158 samples the correction function from Schmitt triggers 91 and 92. If there is a correction to be made from Schmitt triggers 91 or 92, it is made in the same manner as the calibration correction and flip-flops 156 and 158 are reset through OR gate 186. Also bidirectional counter 93 is reset from OR gates 177 and 181 and either AND gates 176 or 180. If there is no correction to be made from Schmitt triggers 91 or 92, flip-flop 179 is triggered through OR gate 175, inverter 178, and AND gate 167. At the same time flip-flop 158 is reset. Flip-flop 179 enables AND gate 182 to apply an inhibit function if there is an output from counter 98, to flip-flop 187, which also resets counter 98. If there is an output from counter 98, flip-flop 179 is reset from OR gate 186 and flip-flop 187 is reset from AND gate 184.. If there is no output from counter 98, there will be an output voltage present from inverter 188 to AND gate 183, which resets flip-flop 179.

By the time this sampling process had taken place, delay circuit 140 or 142 supplies the $L_m$ pulse to one-shot 144 and thus to recorder drive 49 unless inhibited by inhibit gates 146 or 115. The sample circuitry is then reset for another $L_m$ pulse from one-shot 134. Thus, it can be seen that the calibration correction is sampled by means of flip-flop 156, Schmitt trigger 91 and 92 outputs are sampled by flip-flop 158, and the output of counter 98 is sampled by flip-flop 179. In this manner each correction that is to be made can be made without losing any other corrections that are to be made.

It can now be seen that by means of the depth correction system of the present invention, functions representing measured length, drill pipe correction, calibration correction, temperature correction, surface tension, downhole tension, and the stretch coefficient of the particular cable can all be applied to a computer which will provide an accurate indication of depth. Furthermore, the erratic motion of the tool within the borehole can be accurately determined through the use of a downhole tension function and combined with an accurate representation of the average depth position to provide an accurate and instantaneous determination of the depth of the tool within the borehole at all times.

While there has been described what is at present considered to be a preferred embodiment of this invention, it will be obvious to those skilled in the art that various changes and modifications may be made therein without departing from the invention, and it is, therefore, intended to cover all such changes and modifications as fall within the true spirit and scope of the invention.

What is claimed is:

1. A system for determining the changes in position in a borehole of a tool supported therein by a cable, comprising:
    (a) means for generating a cable movement signal representative of the amount of movement of a cable as it is payed out and taken in at the surface as the tool is lowered and raised in the borehole;
    (b) tension measuring means for measuring the tension in the cable at the surface to produce a tension signal;
    (c) means separate from said tension measuring means for generating a characteristic signal representative of a characteristic from within the borehole which affects a desired cable length change indication, said characteristic causing said cable movement indicated by said cable movement signal to be different from a desired cable length change indication; and
    (d) means for combining said cable movement signal, said tension signal, and said characteristic signal to produce an output signal representative of the desired cable length change indication.

2. The system of claim 1 and further including means responsive to said output signal for driving a recorder, said recorder adapted to record borehole logging measurements and to accumulate said output signal for producing an indication of the depth of a cable supported tool.

3. A system for determining the position in a borehole of a tool supported therein by a cable, comprising:
    (a) means for generating a first signal representative of the length of cable payed out and taken in at the surface as the tool is lowered and raised in the borehole;
    (b) means for measuring the tension in the cable at the surface to produce a tension signal;
    (c) means for generating a second signal representative of a characteristic from within the borehole which affects a desired cable length indication; and
    (d) means for generating an output signal derived from said first, second, and tension signals and representative of the position of a cable supported tool.

4. A system for determining the position in a borehole of a tool supported by a cable subject to change in length, comprising:
    (a) means for generating a first signal representative of the length of cable payed out and taken in at the surface as the tool is lowered and raised in the borehole;
    (b) means for measuring the tension in the cable at the tool to produce a first tension signal;
    (c) means for measuring the tension in the cable at the surface to produce a second tension signal; and
    (d) means for generating a second signal derived from said first signal and said first and second tension signals and representative of the position of a cable supported tool.

5. A system for determining the position in a borehole of a tool supported therein by a cable, comprising:
    (a) first means for generating a first signal representative of the length of cable payed out and taken in at the surface as the tool is lowered and raised in the borehole;
    (b) second means for generating a second signal representative of the stretch of the cable with temperature; and
    (c) third means for generating a third signal derived from said first and second signals and representative of the position of a cable supported tool.

6. A system for determining the position in a borehole of a tool supported therein by a cable, comprising:
    (a) first means for generating a first signal representative of the length of cable payed out and taken in at the surface as the tool is lowered and raised in the borehole;
    (b) second means for measuring the tension in the cable to produce a tension signal;
    (c) third means responsive to a third signal for generating a second signal representative of the stretch of the cable with temperature; and
    (d) fourth means for generating said third signal derived from said first, second, and tension signals and representative of the position of a cable supported tool.

7. A system for determining the position in a borehole of a tool supported therein by a cable and referring said position to a position in the borehole as measured by the length of drill pipe in the borehole, comprising:
    (a) first means for generating a first signal representative of the length of cable payed out and taken in at the surface as the tool is lowered and raised in the borehole;
    (b) second means for measuring the tension in the cable to produce a tension signal;
    (c) third means for generating a second signal representative of the difference in length of the drill pipe in the borehole from the drill pipe length measured at the surface of the earth; and
    (d) fourth means for generating a third signal derived from said first, second, and tension signals and representative of the position of a cable supported tool referred to the drill pipe length.

8. A system for determining the position in a borehole of a tool supported therein by a cable and referring said position to a position in the borehole as measured by the length of drill pipe in the borehole, comprising:
  (a) first means for generating a first signal representative of the length of cable payed out and taken in at the surface as the tool is lowered and raised in the borehole;
  (b) second means for generating a second signal representative of the difference in length of the drill pipe in the borehole from the drill pipe length measured at the surface of the earth; and
  (c) third means for generating a third signal derived from said first and second signals and representative of the position of a cable supported tool referred to the drill pipe length.

9. A system for determining the position in a borehole of a tool supported therein by a cable wherein a means for generating a signal representative of the length of the cable payed out and taken in at the surface is calibrated before the tool is lowered into the borehole, comprising:
  (a) first means for generating a first signal representative of the length of cable payed out and taken in at the surface as the tool is lowered and raised in the borehole;
  (b) second means for generating a second signal representative of the calibration correction for said first means; and
  (c) third means for generating a third signal derived from said first and second signals and representative of the position of a cable supported tool.

10. A system for determining the position in a borehole of a tool supported therein by a cable, wherein a means for generating a first signal representative of the length of cable payed out and taken in at the surface is calibrated before the tool is lowered into the borehole, comprising:
  (a) first means for generating a first signal representative of the length of cable payed out and taken in at the surface as the tool is lowered and raised in the borehole;
  (b) second means for measuring the tension in the cable to produce a tension signal;
  (c) third means for generating a second signal representative of the calibration correction for said first means; and
  (d) fourth means for generating a third signal derived from said first, second and tension signals and representative of the position of a cable supported tool.

11. A system for determining the position in a borehole of a tool supported by a cable subject to change in length, comprising:
  (a) means for generating a first signal representative of the length of cable payed out and taken in at the surface as the tool is lowered and raised in the borehole;
  (b) means for measuring the tension in the cable at the tool to produce a first tension signal;
  (c) means for measuring the tension in the cable at the surface to produce a second tension signal;
  (d) means for generating a second signal derived from a third signal representative of the tool position and said first and second tension signals and representative of the change in cable length relating to said first and second tension signals; and
  (e) means for combining said second signal with said first signal to produce said third signal representative of the tool position.

12. A system for determining the position in a borehole of a tool supported by a cable subject to change in length, comprising:
  (a) means for generating a first signal representative of the length of cable payed out and taken in at the surface as the tool is lowered and raised in the borehole;
  (b) means for measuring the change in tension $\Delta T_d$ from a given reference tension in the cable at the tool to produce a first tension signal;
  (c) means for measuring the change in tension $\Delta T_u$ from a given reference tension in the cable at the surface to produce a second tension signal;
  (d) means responsive to said first and second tension signals and a third signal L for generating a second signal $\Delta L$ according to the relationship $$\Delta L = \tfrac{1}{2} E (\Delta T_u + \Delta T_d) dL - E \int_0^L \Delta T_u dL$$

where E is the stretch coefficient of the cable and L is a cable length indication; and
  (e) means for combining said correction signal $\Delta L$ with said first signal to generate the third signal.

13. A system for determining the instantaneous position in a borehole of a tool supported by a cable subject to change in length, comprising:
  (a) means for generating a first signal representative of the length of cable payed out and taken in at the surface as the tool is lowered and raised in the borehole;
  (b) means for measuring the change in tension $\Delta T_d$ from a given reference tension in the cable at the tool to produce a first tension signal;
  (c) means for measuring the change in tension $\Delta T_u$ from a given reference tension in the cable at the surface to produce a second tension signal;
  (d) means responsive to said first and second tension signals and a third signal L for generating a second signal $\Delta L$ according to the relationship $$\Delta L = \left[ \tfrac{1}{2} EL (\Delta T_u + \Delta T_d) - E \int_0^L \Delta T_u dL \right] (f_L) + u_d (f_h)$$

where E is the stretch coefficient of the cable, $u_d$ is the total cable stretch due to the change in tension $\Delta T_d$, $(f_L)$ signifies a low frequency component, and $(f_h)$ signifies a high frequency component; and
  (e) means for combining said second signal with said first signal to generate the third signal L representative of the desired cable length indication.

14. A system for determining the instantaneous position in a borehole of a tool supported by a cable subject to change in length, comprising:
  (a) first means for generating a first signal representative of the length of cable payed out and taken in at the surface as the tool is lowered and raised in the borehole;
  (b) second means for measuring the change in tension $\Delta T_d$ from a given reference tension in the cable at the tool to produce a first tension signal;
  (c) third means for measuring the change in tension $\Delta T_u$ from a given reference tension in the cable at the surface to produce a second tension signal;
  (d) fourth means for generating a second signal derived from a fourth signal and said first and second tension signals and representative of the change in cable length relating to said first and second tension signals, said fourth means including:
    (1) fifth means coupled to said first tension measuring means for generating a third signal $u_d$ representative of the total cable stretch relating to the first tension signal $\Delta T_d$;
    (2) filter means coupled to said second tension measuring means and said fifth means for filtering out approximately one-half of $u_d$ and passing most of $\Delta T_u$ below a given frequency $f$, and passing most of $u_d$ and filtering out most of $\Delta T_u$ above said given frequency $f$;
    (3) computing means coupled to said filter means for deriving said second signal; and
  (e) means for combining said second signal with said first signal to produce the fourth signal representative of the desired cable length indication.

15. A system for determining the instantaneous position in a borehole of a tool supported by a cable subject to change in length, comprising:
  (a) first means for generating a first signal representative of the length of cable payed out and taken in at the surface as the tool is lowered and raised in the borehole;
  (b) second means for measuring the change in tension $\Delta T_d$ from a given reference tension in the cable at the tool to produce a first tension signal;
  (c) third means for measuring the change in tension $\Delta T_u$ from a given reference tension in the cable at the surface to produce a second tension signal;
  (d) fourth means for generating a second signal $\Delta L$ derived from a fourth signal L and said first and second tension signals and representative of the change in cable length relating to said first and second tension signals according to the relationship $$\Delta L = \left[ \tfrac{1}{2} EL(\Delta T_u + \Delta T_d) - E \int_0^L \Delta T_u dL \right](f_L) + u_d(f_h)$$

where E is the cable stretch coefficient, $(f_L)$ signifies a low frequency component and $(f_h)$ signifies a high frequency component, said fourth means including:
    (1) fifth means coupled to said second means for generating said third signal $u_d$ representative of the total cable stretch relating to the first tension signal $\Delta T_d$;
    (2) first filter means coupled to said third means for passing substantially all of said second tension signal $\Delta T_u$ below a given frequency $f$ and filtering out substantially all of said tension signal above said given frequency $f$, said first filter means supplying said $(f_L)$ component;
    (3) second filter means coupled to said fifth means for filtering out approximately one-half of said third signal $u_d$ below said given frequency $f$ and passing substantially all of said third signal $u_d$ above said given frequency $f$, said second filter means supplying said $(f_h)$ component;
    (4) computing means coupled to said first and second filter means for deriving said second signal $\Delta L$; and
  (e) sixth means for combining said second signal with said first signal to produce said fourth signal L representative of the desired cable length indication.

16. A system for determining the instantaneous position in a borehole of a tool supported by a cable subject to change in length, comprising:
  (a) first means for generating a first signal representative of the length of cable payed out and taken in at the surface as the tool is lowered and raised in the borehole;
  (b) second means for measuring the change in tension $\Delta T_d$ from a given reference tension in the cable at the tool to produce a first tension signal;
  (c) third means for measuring the change in tension $\Delta T_u$ from a given reference tension in the cable at the surface to produce a second tension signal;
  (d) fourth means coupled to a seventh means for generating a fifth signal X representative of cable stretch relating to a characteristic which affects measured cable length;
  (e) fifth means for generating a second signal $\Delta L$ derived from a fourth signal L, said fifth signal, and said first and second tension signals and representative of the change in cable length relating to said cable length characteristic and measured tension according to the relationship $$\Delta L = \left[ \tfrac{1}{2} EL(\Delta T_u + \Delta T_d) - E \int_0^L \Delta T_u dL \right]$$
$$(f_L) + u_d(f_h) + X$$

where E is the cable stretch coefficient, $(f_L)$ signifies a low frequency component and $(f_h)$ signifies a high frequency component, said fifth means including:
  (1) sixth means responsive to said first tension signal for generating said third signal $u_d$ representative of the total cable stretch relating to the first tension signal $\Delta T_d$;
  (2) first filter means coupled to said third means for passing substantially all of said second tension signal $\Delta T_u$ below a given frequency $f$ and filtering out substantially all of said tension signal above said given frequency $f$, said first filter means producing said $(f_L)$ component;
  (3) second filter means coupled to said sixth means for filtering out approximately one-half of said third signal $u_d$ below said given frequency $f$ and passing substantially all of said third signal $u_d$ above said given frequency $f$, said second filter means producing said $(f_h)$ component;
  (4) computing means coupled to said first and second filter means and said fourth means for deriving said second signal $\Delta L$; and
(f) seventh means for combining said second signal with said first signal to produce said fourth signal L representative of the desired cable length indication.

17. A system for determining the instantaneous position in a borehole of a tool supported by a cable subject to change in length wherein a first means for generating a first signal representative of the length of cable payed out and taken in at the surface is calibrated before lowering the tool into the borehole, comprising:
  (a) first means for generating a first signal representative of the length of cable payed out and taken in at the surface as the tool is lowered and raised in the borehole;
  (b) second means for measuring the change in tension $\Delta T_d$ from a given reference tension in the cable at the tool to produce a first tension signal;
  (c) third means for measuring the change in tension $\Delta T_u$ from a given reference tension in the cable at the surface to produce a second tension signal;
  (d) fourth means for generating a fifth signal $L_{cal}$ representative of the calibration correction of said first means;
  (e) fifth means for generating a second signal $\Delta L$ derived from a fourth signal L, said fifth signal, and said first and second tension signals and representative of the change in cable length relating to said first and second tension measurements according to the relationship $$\Delta L = \left[ \tfrac{1}{2} EL(\Delta T_u + \Delta T_d) - E \int_0^L \Delta T_u dL \right](f_L) + u_d(f_h)$$

where E is the cable stretch coefficient, $(f_L)$ signifies a low frequency component and $(f_h)$ signifies a high frequency component, said fifth means including:
    (1) sixth means coupled to said second means for generating said third signal $u_d$ representative of the total cable stretch relating to the first tension signal $\Delta T_d$;
    (2) first filter means coupled to said third means for passing substantially all of said second tension signal $\Delta T_u$ below a given frequency $f$ and filtering out substantially all of said tension signal above said given frequency $f$, said first filter means producing said $(f_L)$ component;
    (3) second filter means coupled to said sixth means for filtering out approximately one-half of said third signal $u_d$ below said given frequency $f$ and passing substantially all of said third signal $u_d$ above said given frequency $f$, said second filter means producing said $(f_h)$ component;
    (4) computing means coupled to said first and second filter means and said fourth means for deriving said second signal ΔL; and (f) seventh means for combining said second signal with said first signal to produce said fourth signal L representative of the desired cable length indication.

18. A method of determining the position in a borehole of a tool supported therein by a cable, comprising:
(a) generating a first signal representative of the length of cable payed out and taken in at the surface as the tool is lowered and raised in the borehole;
(b) measuring the tension in the cable at the surface to produce a tension signal;
(c) measuring a characteristic which affects a desired cable length indication from within the borehole;
(d) generating a second signal representative of said measured characteristic; and
(e) generating a third signal derived from said first, second, and tension signals and representative of the desired cable length indication.

19. A method of determining the changes in position in a borehole of a tool supported therein by a cable, comprising:
(a) generating a cable movement signal representative of the amount of movement of a cable payed out and taken in at the surface as the tool is lowered and raised in the borehole;
(b) measuring the tension in the cable at the surface to produce a tension signal;
(c) measuring a characteristic which affects a desired cable length indication from within the borehole;
(d) generating a characteristic signal derived from said measured characteristic and a third signal; and
(e) generating said third signal derived from said cable movement, characteristic, and third signals and representative of the changes in position of a cable supported tool.

20. A method of determining the position in a borehole of a tool supported therein by a cable, comprising:
(a) generating a first signal representative of the length of cable payed out and taken in at the surface as the tool is lowered and raised in the borehole;
(b) measuring the temperature within the borehole;
(c) generating a second signal derived from said temperature measurement and a third signal and representative of the cable stretch due to temperature; and
(d) generating said third signal derived from said first and second signals and representative of the position of a cable supported tool.

21. A method of determining the position in a borehole of a tool supported therein by a cable and referring said position to a position in the borehole as measured by the length of drill pipe in the borehole, comprising:
(a) generating a first signal representative of the length of cable payed out and taken in at the surface as the tool is lowered and raised in the borehole;
(b) measuring the difference in length of the drill pipe in the borehole from the drill pipe length measured at the surface of the earth;
(c) generating a second signal derived from said drill pipe measurement and a third signal and representative of the drill pipe correction; and
(d) generating said third signal derived from said first and second signals and representative of the position of a cable supported tool referred to the drill pipe length.

22. A method of determining the position in a borehole of a tool suported therein by a cable, comprising:
(a) measuring the cable length indicating error of a cable length indicating means;
(b) generating a first signal from said cable length indicating means representative of the length of cable payed out and taken in at the surface as the tool is lowered and raised in the borehole;
(c) generating a second signal representative of said cable length indicating error; and (d) generating a third signal derived from said first and second signals and representative of the position of a cable supported tool.

23. A method of determining the position in a borehole of a tool supported by a cable subject to change in length, comprising:
(a) generating a first signal representative of the length of cable payed out and taken in at the surface as the tool is lowered and raised in the borehole;
(b) measuring the tension in the cable at the tool to produce a first tension signal;
(c) measuring the tension on the cable at the surface to produce a second tension signal; and
(d) generating a second signal derived from said first signal and said first and second tension signals and representative of the position of a cable supported tool.

24. A method of determining the position in a borehole of a tool supported by a cable subject to change in length, comprising:
(a) generating a first signal representative of the length of cable payed out and taken in at the surface as the tool is lowered and raised in the borehole;
(b) measuring the tension in the cable at the tool to produce a first tension signal;
(c) measuring the tension in the cable at the surface to produce a second tension signal;
(d) measuring a characteristic which affects a desired cable length indication;
(e) generating a second signal representative of said characteristic; and
(f) generating a third signal derived from said first and second signals and said first and second tension signals and representative of the position of a cable supported tool.

25. A method of determining the position in a borehole of a tool supported by a cable subject to change in length, comprising:
(a) generating a first signal representative of the length of cable payed out and taken in at the surface as the tool is lowered and raised in the borehole;
(b) measuring the change in tension $\Delta T_d$ from a given reference tension in the cable at the tool to produce a first tension signal;
(c) measuring the change in tension $\Delta T_u$ from a given reference tension in the cable at the tool to produce a first tension signal;
(d) generating a second signal ΔL derived from said first signal and said first and second tension signals and a third signal L in accordance with the relationship $$\Delta L = \left[ \frac{1}{2} EL(\Delta T_u + \Delta T_d) - E \int_0^L \Delta T_u dL \right] (f_L) + u_d(f_h)$$

where E is the stretch coefficient of the cable, $u_d$ is the total cable stretch due to the change in tension $\Delta T_d$, $(f_L)$ signifies a low frequency component, and $(f_h)$ signifies a high frequency component, the second signal being representative of the change in cable length relating to said first and second tension signals; and
(e) combining said second second signal with said first signal to produce a third signal L representative of the position of a cable supported tool.

26. A method of determining the position in a borehole of a tool supported by a cable subject to change in length, comprising:
(a) generating a first signal representative of the length of cable payed out and taken in at the surface as the tool is lowered and raised in the borehole;
(b) measuring the change in tension $\Delta T_d$ from a given reference tension in the cable at the tool to produce a first tension signal;
(c) measuring the change in tension $\Delta T_u$ from a given reference tension in the cable at the surface to produce a second tension signal;

(d) measuring a characteristic which affects a desired cable length indication;

(e) generating a second signal X representative of said characteristic;

(f) generating a third signal ΔL derived from said first and second signals, a fourth signal L, and said first and second tension signals in accordance with the relationship $$\Delta L = \left[ \tfrac{1}{2} EL(\Delta T_u + \Delta T_d) - E \int_0^L \Delta T_u dL \right] (f_L) + u_d(f_h) + X$$

where E is the stretch coefficient of the cable, $u_d$ is the total cable stretch relating to the tension signal $\Delta T_d$, $(f_L)$ signifies a low frequency component, and $(f_h)$ signifies a high frequency component, the third signal ΔL being representative of the change in cable length relating to said first and second tension signals; and (g) combining said third signal with said first signal to produce said fourth signal L representative of the tool position.

27. The method of claim 26 wherein the second signal X is representative of the changes in cable length with temperature.

28. The method of claim 26 wherein the second signal X is representative of the difference in length of the drill pipe in the borehole from the drill pipe length measured at the surface of the earth.

29. The method of claim 26 and further including measuring the error in the first signal to obtain a calibration correction, and the second signal X is representative of the calibration correction.

30. A system for determining the changes in position of a cable supported tool in a borehole and correcting these changes in position for the difference between the length of drill pipe measured at the surface of the earth and the length measured in a borehole, comprising:

(a) means responsive to the movement of a cable for producing a cable movement signal representative of the amount of cable movement;

(b) means for measuring the tension in a cable at the surface of the earth to produce a tension signal;

(c) means for generating a drill pipe correction signal representative of the difference in length of drill pipe in the borehole from the length measured at the surface of the earth; and (d) means for combining said cable movement, tension, and drill pipe correction signals to produce an output signal representative of changes in tool position.

31. A system for determining the changes in position of a cable supported tool in a borehole wherein a cable movement measuring means is calibrated before a tool is lowered in a borehole, comprising:

(a) cable movement measuring means responsive to the movement of a cable for producing a cable movement signal representative of the amount of cable movement;

(b) means for measuring the tension in a cable at the surface of the earth to produce a tension signal;

(c) means for generating a calibration correction signal representative of a calibration correction for said cable movement measuring means; and (d) means for combining said cable movement, tension, and calibration correction signals to produce an output signal representative of changes in tool position.

32. A system for determining the changes in position of a cable supported tool in a borehole, comprising:

(a) means responsive to the movement of a cable for producing a cable movement signal representative of the amount of cable movement;

(b) means for measuring the tension in a cable at the surface of the earth to produce a first tension signal;

(c) means for measuring the tension in a cable in the vicinity of a tool to produce a second tension signal; and (d) means for combining said cable movement and first and second tension signals to produce an output signal representative of changes in tool position.

33. A system for determining the changes in position of a cable supported tool in a borehole, comprising:

(a) means responsive to the movement of a cable for producing a cable movement signal $\Delta L_m$ representative of the amount of cable movement;

(b) means for measuring the change in tension $\Delta T_u$ from a given reference tension in a cable at the surface of the earth to produce a first tension signal;

(c) means for measuring the change in tension $\Delta T_d$ from a given reference tension in a cable in the vicinity of a tool to produce a second tension signal; and (d) means for combining said cable movement and first and second tension signals to produce an output signal $\Delta L_0$ representative of changes in tool position in accordance with the relationship $$\Delta L_0 = L\Delta_m + \tfrac{1}{2} E(\Delta T_u + \Delta T_d) dL - E \int_0^l \Delta T_u dL$$

where E is the cable stretch coefficient, and $dL$ and $l$ are incremental lengths.

34. A system for determining the changes in position of a cable supported tool in a borehole, comprising:

(a) means responsive to the movement of a cable for producing a cable movement signal $\Delta L_m$ representative of the amount of cable movement;

(b) means for measuring the change in tension $\Delta T_u$ from a given reference tension in a cable at the surface of the earth to produce a first tension signal;

(c) means for measuring the change in tension $\Delta T_d$ from a given reference tension in a cable in the vicinity of a tool to produce a second tension signal; and (d) means for combining said cable movement and first and second tension signals to produce an output signal $\Delta L_0$ representative of changes in tool position in accordance with the relationship $$\Delta L_0 = \Delta L_m + \left[ \tfrac{1}{2} E(\Delta T_u + \Delta T_d) dL - E \int_0^1 \Delta T_u dL \right] (f_L) \Delta u_d(f_h)$$

where E is the cable stretch coefficient, $dL$ and $l$ are incremental lengths, $\Delta u_d$ represents changes in cable length relating to the tension measurement $\Delta T_d$, $(f_L)$ signifies a low frequency component and $(f_h)$ signifies a high frequency component.

35 The apparatus of claim 34 wherein said combining means includes computing means responsive to said second tension signal and a signal representative of cable movement for producing a computed signal $\Delta u_d$ representative of the total cable stretch relating to said second tension signal $\Delta T_d$, high pass filter means responsive to said signal $u_d$ for passing approximately one-half of the amplitude of low frequency components, all of the amplitude of high frequency components of said signal $u_d$, low frequency filter means responsive to said first tension signal $\Delta T_u$ for passing only low frequency components of said first tension signal $\Delta T_u$, means responsive to the output signals from both of said filter means for producing said output signal $\Delta L_0$.

36. A system for determining the changes in position of a cable supported tool in a borehole, comprising:

(a) means responsive to the movement of a cable for producing a cable movement signal representative of the amount of cable movement;

(b) means for measuring the tension in a cable at the surface of the earth to produce a tension signal;

(c) means for generating a temperature signal representative of cable stretch as a function of temperature; and (d) means for combining said cable movement, tension, and temperature signals to produce an output signal representative of changes in tool position.

37. A method of determining the changes in position of a cable supported tool in a borehole, comprising:
(a) measuring the movement of a cable to produce a cable movement measurement representative of the amount of cable movement;
(b) measuring the tension in a cable at the surface of the earth to produce a tension measurement;
(c) deriving a temperature measurement representative of cable stretch as a function of temperature; and
(d) combining said cable movement, tension, and temperature measurements to produce a measure of the changes in tool position.

38. A method of determining the changes in position of a cable supported tool in a borehole and correcting these changes in position for the difference between the length of drill pipe measured at the surface of the earth and the length measured in a borehole, comprising:
(a) measuring the movement of a cable to produce a cable movement measurement representative of the amount of cable movement;
(b) measuring the tension in a cable at the surface of the earth to produce a tension measurement;
(c) producing a drill pipe correction measurement representative of the difference in length of drill pipe in the borehole from the length measured at the surface of the earth; and
(d) combining said cable movement, tension, and drill pipe correction measurements to produce a measure of the changes in tool position.

39. A method of determining the changes in position of a cable supported tool in a borehole wherein a cable movement measuring means is calibrated before a tool is lowered in a borehole, comprising:
(a) measuring the movement of a cable with a cable movement measuring means to produce a cable movement signal representative of the amount of cable movement;
(b) measuring the tension in a cable at the surface of the earth to produce a tension signal;
(c) generating a calibration correction signal representative of a calibration correction for said cable movement measuring means; and
(d) combining said cable movement, tension, and calibration correction signals to produce an output signal representative of changes in tool position.

40. A method of determining the changes in position of a cable supported tool in a borehole, comprising:
(a) measuring the movement of a cable to produce a cable movement measurement representative of the amount of cable movement;
(b) measuring the tension in a cable at the surface of the earth to produce a first tension measurement;
(c) measuring the tension in a cable in the vicinity of a tool to produce a second tension measurement; and
(d) combining said cable movement and first and second tension measurements to produce a measure of the changes in tool position.

41. A method of determining the changes in position of a cable supported tool in a borehole, comprising:
(a) measuring the movement of a cable for producing a cable movement measurement $\Delta L_m$ representative of the amount of cable movement;
(b) measuring the change in tension $\Delta T_u$ from a given reference tension in a cable at the surface of the earth to produce a first tension measurement;
(c) measuring the change in tension $\Delta T_d$ from a given reference tension in a cable in the vicinity of a tool to produce a second tension measurement; and
(d) combining said cable movement and first and second tension measurements to produce a measure of the changes in tool position $\Delta L_0$ in accordance with the relationship $$\Delta L_0 = \Delta L_m + \tfrac{1}{2}E(\Delta T_u + \Delta T_d)dL - E\int_0^1 \Delta T_u dL$$

where E is the cable stretch coefficient, and $dL$ and $l$ are incremental lengths.

42. A method of determining the changes in position of a cable supported tool in a borehole, comprising:
(a) measuring the movement of a cable for producing a cable movement measurement $\Delta L_m$ representative of the amount of cable movement;
(b) measuring the change in tension $\Delta T_u$ from a given reference tension in a cable at the surface of the earth to produce a first tension measurement;
(c) measuring the change in tension $\Delta T_d$ from a given reference tension in a cable in the vicinity of a tool to produce a second tension measurement; and
(d) combining said cable movement and first and second tension measurements to produce a measure of the changes in tool position $\Delta L_0$ in accordance with the relationship $$\Delta L_0 = \Delta L_m + \left[\tfrac{1}{2}E(\Delta T_u + \Delta T_d)dL - E\int_0^1 \Delta T_u dL\right](f_L)\Delta u_d(f_h)$$

where E is the cable stretch coefficient, $dL$ and $l$ are incremental lengths, $\Delta u_d$ represents changes in cable length relating to the tension measurement $\Delta T_d$, $(f_L)$ signifies a low frequency component and $(f_h)$ signifies a high frequency component.

References Cited

UNITED STATES PATENTS 3,027,649   4/1962   Sloan.

LEONARD FORMAN, Primary Examiner

F. J. D'AMBROSIO, Assistant Examiner

U.S. Cl. X.R.

73—151; 340—18